(12) United States Patent
Kato

(10) Patent No.: US 6,174,936 B1
(45) Date of Patent: Jan. 16, 2001

(54) OIL-BASED INK FOR PREPARATION OF PRINTING PLATE BY INK JET PROCESS AND METHOD FOR PREPARATION OF PRINTING PLATE INK JET PROCESS

(75) Inventor: Eiichi Kato, Shizuoka (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/085,100

(22) Filed: May 28, 1998

(30) Foreign Application Priority Data

May 28, 1997 (JP) .................................................... 9-154509

(51) Int. Cl.$^7$ .......................... C09D 11/02; C09D 11/10; G03G 13/28
(52) U.S. Cl. ............................................. 523/160; 430/49
(58) Field of Search .................................... 523/160, 161; 106/31.6; 430/114, 115, 49, 137, 126, 904, 270, 302; 347/54, 55, 103, 107

(56) References Cited

U.S. PATENT DOCUMENTS

| | | | |
|---|---|---|---|
| 4,599,288 | * | 7/1986 | Fuchizawa ............................. 430/63 |
| 4,665,002 | * | 5/1987 | Dan et al. ............................ 430/114 |
| 4,983,486 | * | 1/1991 | Kato et al. ........................... 430/115 |
| 5,039,598 | * | 8/1991 | Abramsohn et al. ................. 430/347 |
| 5,106,716 | * | 4/1992 | Kato et al. ........................... 430/114 |
| 5,308,730 | * | 5/1994 | Szuki et al. .......................... 430/115 |
| 5,582,106 | * | 12/1996 | Kanda et al. ......................... 101/462 |
| 5,683,841 | * | 11/1997 | Kato ...................................... 430/49 |
| 5,714,250 | * | 2/1998 | Kato et al. ........................... 428/328 |
| 5,914,211 | * | 6/1999 | Hashino et al. ...................... 430/166 |

OTHER PUBLICATIONS

Leach, R.H. and Pierce, R.J.; The Printing Ink Manual, Blueprint, London (p. 63) 1993.*

* cited by examiner

Primary Examiner—Vasu Jagannathan
Assistant Examiner—Callie E. Shosho
(74) Attorney, Agent, or Firm—Sughrue, Mion, Zinn, Macpeak & Seas, PLLC

(57) ABSTRACT

An oil-based ink for the preparation of a printing plate by an ink jet process including dropwise supplying from a nozzle an oil-based ink including resin particles dispersed in a nonaqueous carrier liquid having an electric resistance of $10^9$ Ωcm or more and a dielectric constant of 3.5 or less on a lithographic printing plate precursor including a water-resistant support and a lithographically printable hydrophilic surface to form an image, wherein the resin particles dispersed are copolymer resin particles obtained by polymerization granulation of a solution including three particular components.

7 Claims, 2 Drawing Sheets

OIL-BASED INK FOR PREPARATION OF PRINTING PLATE BY INK JET PROCESS AND METHOD FOR PREPARATION OF PRINTING PLATE INK JET PROCESS

FIELD OF THE INVENTION

The present invention relates to an oil-based ink for the preparation of a printing plate by an ink jet process, and a method for the preparation of a printing plate by an ink jet process using it. More particularly, the present invention relates to an oil-based ink excellent in dispersion stability, redispersibility, storage stability, image reproducibility and printing durability (press life), and a method for the preparation of a printing plate by an ink jet process using it.

BACKGROUND OF THE INVENTION

With recent developments in business machines and progress in office automation, in the field of small commercial printing, platemaking systems wherein an image is formed on a direct imaging type lithographic printing plate precursor comprising a water-resistant support having provided thereon an image receiving layer having a hydrophilic surface in a various manner to prepare an offset lithographic printing plate have been widely employed.

A conventional lithographic printing plate precursor for direct imaging type comprises a support formed of paper subjected to water-resistant treatment or a plastic film having provided thereon an image accepting layer (or an image receiving layer) containing an inorganic pigment, a water-soluble resin and a water resistance imparting agent. On such a direct imaging type lithographic printing plate precursor, a lipophilic image is formed with a typewriter or by hand writing using a lipophilic ink, or by transferring an image from an ink ribbon by heat melting with a heat transfer printer, thereby preparing a printing plate.

However, the printing plate prepared by such a method are not sufficient in mechanical strength of image areas, so that cutting easily takes place in the image areas during printing.

On the other hand, ink jet recording is a recording method low in noise and printable at a high speed, and has recently been rapidly popularized.

As such ink jet recording methods, there are proposed various systems such as a so-called electric field controlling system in which ink is discharged using electrostatic attraction, a so-called drop-on-demand system (pressure pulse system) in which ink is discharged using oscillation pressure of a piezoelectric element, and a so-called bubble (thermal) jet system in which ink is discharged using pressure generated by forming bubbles and allowing them to grow up with heating at high temperature. According to these systems, highly accurate images can be obtained.

In these ink jet recording systems, aqueous ink using water as a main solvent, and oil-based ink using an organic solvent as a main solvent are conventionally employed.

It is also known that plate making is performed using an ink jet printer on a lithographic printing plate precursor for direct imaging type described above. In this case, although aqueous ink in which water is used as a dispersion medium is employed, the aqueous ink has the problems in that blurs appear in images formed on the precursor and in that a picture drawing speed is decreased because of slow drying. In order to overcome such problems, a method using oil-based ink in which a nonaqueous solvent is used as a dispersion medium is proposed as described in JP-A-54-117203 (the term "JP-A" as used herein means an "unexamined published Japanese patent application").

However, this method is still insufficient, because blurs are observed in images formed by plate making and blurs are developed in prints. Further, the number of prints obtained is limited to several hundred at most. Moreover, such ink has the problem of being liable to clog a nozzle for discharging minute ink droplets which make it possible to obtain images having high resolution by the plate making.

In the ink jet recording systems, ink is usually discharged from a nozzle through a filter, so that abnormal discharge of ink tends to take place by clogging of the nozzle or the filter, change in fluidity of the ink with the lapse of time, or various other factors.

This abnormal discharge of ink occurs with respect to not only an aqueous ink composition, but also an oil-based ink composition. Various proposals for controlling the abnormal discharge of ink have been made. For example, in order to prevent the abnormal discharge of ink in case of using an oil-based ink composition, it is proposed that the viscosity and the specific resistance of the ink composition is controlled as described in JP-A-49-50935, for the ink jet recording method of the electric field controlling system. It is also proposed that the dielectric constant and the specific resistance of the solvent used in the ink composition are controlled as described in JP-A-53-29808.

Furthermore, as attempts to prevent clogging of nozzles caused by ordinary oil-based ink for ink jet printer, there are proposed, for example, methods in which the dispersion stability of pigment particles is improved (e.g., JP-A-4-25573, JP-A-5-25413 and JP-A-5-65443) and methods in which specific compounds are incorporated into ink compositions (e.g., JP-A-3-79677, JP-A-3-64377, JP-A-4-202386 and JP-A-7-109431).

However, when these ink compositions are used for the image formation of lithographic printing plate, the images formed are poor in image strength during printing, and a printing plate which has a sufficient press life cannot been obtained.

SUMMARY OF THE INVENTION

An object of the present invention is to provide an oil-based ink for the preparation of a printing plate by an ink jet process which is excellent in redispersibility, storage stability, image reproducibility and press life.

Another object of the present invention is to provide an oil-based ink for the preparation of a printing plate by an ink jet process which does not induce clogging in a nozzle and in the course of ink supply and which makes it possible to conduct stable discharge.

A further object of the present invention is to provide a method for the preparation of a printing plate by an ink jet process in which ink jet recording is carried out stably when repeated and which provides a lithographic printing plate excellent in press life.

A still further object of the present invention is to provide a method for the preparation of a printing plate by an ink jet process which makes it possible to provide many sheets of prints having clear images.

Other objects of the present invention will become apparent from the following description.

It has been found that these objects of the present invention are accomplished by an oil-based ink for the preparation of a printing plate by an ink jet process comprising dropwise supplying from a nozzle an oil-based ink comprising resin particles dispersed in a nonaqueous carrier liquid having an electric resistance of $10^9$ Ωcm or more and a dielectric constant of 3.5 or less on a lithographic printing plate precursor comprising a water-resistant support and a lithographically printable hydrophilic surface to form an image, wherein the resin particles dispersed are copolymer resin particles obtained by polymerization granulation of a solution comprising (i), (ii) and (iii):

(i) at least one monofunctional monomer (A) which is soluble in a nonaqueous solvent that is at least miscible with the nonaqueous carrier liquid and becomes insoluble in the nonaqueous solvent by polymerization;

(ii) at least one monomer (C) represented by the formula (I) shown below which is copolymerizable with the monomer (A):

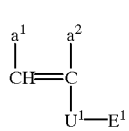

(I)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (III):

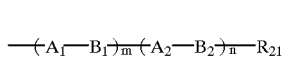

(III)

wherein $R_{21}$ represents a hydrogen atom or an aliphatic group having from 1 to 18 carbon atoms;

$B_1$ and $B_2$, which may be the same or different, each represents —O—, —S—, —CO—, —CO$_2$—, —OCO—, —SO$_2$—, —N(R$_{22}$)—, —CON(R$_{22}$)—, —N(R$_{22}$)CO—, —N(R$_{22}$)SO$_2$—, —SO$_2$N(R$_{22}$)—, —NHCO$_2$— or —NHCONH—, in which $R_{22}$ has the same meaning as defined for $R_{21}$;

$A_1$ and $A_2$, which may be the same or different, each represents at least one group selected from the group consisting of a group represented by the following formula (IIIa) and a hydrocarbon group having from 1 to 18 carbon atoms, which each may be substituted, provided that, in the case of two or more, it represents a combination of the group represented by the formula (IIIa) and/or the hydrocarbon group:

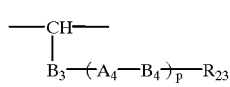

(IIIa)

wherein $B_3$ and $B_4$, which may be the same or different, each has the same meaning as defined for $B_1$ or $B_2$;

$A_4$ represents a hydrocarbon group having from 1 to 18 carbon atoms which may be substituted;

$R_{23}$ has the same meaning as defined for $R_{21}$; and m, n and p, which may be the same or different, each represents an integer of from 0 to 4, provided that m and n are not 0 at the same time;

$U^1$ represents —COO—, —CONH—, —CON(E$_2$)—, —OCO—, —CONHCOO—, —CH$_2$COO—, —(CH$_2$)$_s$OCO—, —O—, —C$_6$H$_4$— or —C$_6$H$_4$—COO—, in which $E_2$ represents an aliphatic group or a substituent represented by the formula (III) described above, and s represents an integer of from 1 to 4; and $a^1$ and $a^2$, which may be the same or different, each represents a hydrogen atom, a halogen atom, a cyano group, an alkyl group, —COO—E$_3$ or —CH$_2$COO—E$_3$, in which $E_3$ represents an aliphatic group;

(iii) at least one resin for dispersion stabilization (P) which is soluble in the nonaqueous solvent and is a copolymer represented by the formula (II) shown below:

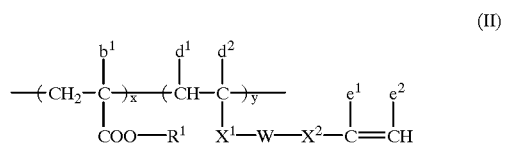

(II)

wherein $R^1$ represents an alkyl group having from 10 to 32 carbon atoms or an alkenyl group having from 10 to 32 carbon atoms;

$b^1$ represents a hydrogen atom or an alkyl group having from 1 to 4 carbon atoms;

$X^1$ and $X^2$, which may be the same or different, each has the same meaning as defined for $U^1$ in the formula (I);

W represents a group connecting $X^1$ and $X^2$ and comprising a carbon atom or a hetero atom selected from an oxygen atom, a sulfur atom, a silicon atom and a nitrogen atom;

$d^1$, $d^2$, $e^1$ and $e^2$, which may be the same or different, each has the same meaning as defined for $a^1$ or $a^2$ in the formula (I); and x and y each represents a weight ratio of each repeating unit, x represents a number of from 90 to 99, y represents a number of from 10 to 1 and a method for the preparation of a printing plate by an ink jet precess comprising dropwise supplying from a nozzle the oil-based ink described above on a water-resistant support having a lithographically printable hydrophilic surface to form an image.

BRIEF DESCRIPTION OF THE
ACCOMPANYING DRAWINGS

EXPLANATION OF THE SYMBOLS

Figure 1:
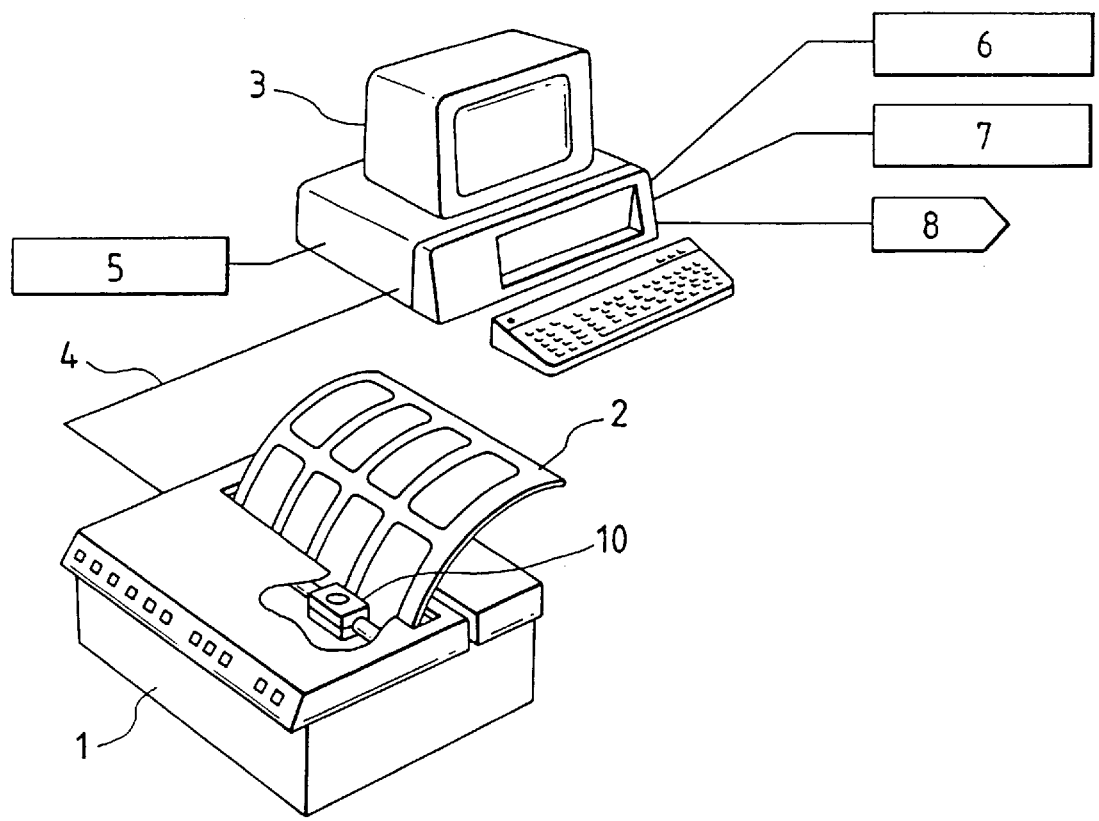
FIG. 1 is a schematic view showing one embodiment of a device system which can be used in the present invention.

| | |
|---|---|
| 1 | Ink jet recording device |
| 2 | Master |
| 3 | Computer |
| 4 | Path |
| 5 | Video camera |
| 6 | Hard disk |
| 7 | Floppy disk |

| 8 | Mouse |
| 10 | Head |
| 10a | Discharge slit |
| 10b | Discharge electrode |
| 10c | Counter electrode |
| 11 | Oil-based ink |
| 101 | Upper unit |
| 102 | Lower unit |

DETAILED DESCRIPTION OF THE INVENTION

The present invention is characterized in that the above-described oil-based ink is discharged on a lithographic printing plate precursor by an ink jet process to form an image. The oil-based ink used is excellent in dispersion stability, redispersibility and storage stability, and the resulting lithographic printing plate can provide a large number of prints having clear images.

The oil-based ink for use in the present invention is described in greater detail below.

The nonaqueous carrier liquid having an electric resistance of $10^9$ Ωcm or more and a dielectric constant of 3.5 or less used in the present invention preferably includes a straight chain or branched aliphatic hydrocarbon, an alicyclic hydrocarbon, an aromatic hydrocarbon and a halogen-substituted product thereof. Specific examples of the non-aqueous carrier liquid include octane, isooctane, decane, isodecane, decalin, nonane, dodecane, isododecane, cyclohexane, cyclooctane, cyclodecane, benzene, toluene, xylene, mesitylene Isopar E, Isopar G, Isopar H, Isopar L (Isopar: trade name of Exxon Co.), Shellsol 70, Shellsol 71 (Shellsol: trade name of Shell Oil Co.), Amsco OME and Amsco 460 (Amsco: trade name of Spirits Co.), and mixtures thereof. The upper limit value of the electric resistance of the nonaqueous carrier liquid is about $10^{16}$ Ωcm, and the lower limit value of the dielectric constant thereof is about 1.80.

The nonaqueous dispersed resin particles (hereinafter also referred to as "latex particles"), which are the most important constituent in the oil-based ink of the present invention, are those obtained by polymerization granulation in a non-aqueous solvent using a monofunctional monomer (A), a monomer (C) having the specific substituent and a resin for dispersion stabilization (P) which is soluble in the nonaqueous solvent and a random copolymer containing a polymer component having a double bond group copolymerizable with the monofunctional monomer (A).

As the nonaqueous solvent, those miscible with the nonaqueous carrier liquid of the above-described oil-based ink are basically usable.

Specifically, as the solvent used in the preparation of the dispersed resin particles, any solvent may be used as far as it is miscible with the above-described carrier liquid. Preferred examples thereof include a straight chain or branched aliphatic hydrocarbon, an alicyclic hydrocarbon, an aromatic hydrocarbon and a halogen-substituted product thereof. For example, hexane, octane, isooctane, decane, isodecane, decalin, nonane, dodecane, isododecane, Isopar E, Isopar G, Isopar H, Isopar L, Shellsol 70, Shellsol 71, Amsco OME and Amsco 460 can be used individually or as a mixture thereof.

A solvent which can be used by mixing together with the nonaqueous solvent includes an alcohol (e.g., ethyl alcohol, propyl alcohol, butyl alcohol, ethylene glycol monomethyl ether, or a fluorinated alcohol), a ketone (e.g., methyl ethyl ketone, acetophenone, or cyclohexanone), a carboxylic acid ester (e.g., ethyl acetate, propyl acetate, butyl acetate, methyl propionate, ethyl propionate, ethyl benzoate, ethylene glycol monomethyl ether acetate), an ether (e.g., dipropyl ether, ethylene glycol dimethyl ether, propylene glycol dimethyl ether, tetrahydrofuran, or dioxane) and a halogenated hydrocarbon (e.g., chloroform, dichloroethane, or methylchloroform).

The solvent used together with the nonaqueous solvent is desirably removed by distillation under heating or a reduced pressure after polymerization granulation. However, even if it is introduced into oil-based ink as a latex particle dispersion, no problem is encountered as far as the requirements that the electric resistance of the ink is $10^9$ Ωcm or more and that the dielectric constant thereof is 3.5 or less are satisfied.

It is ordinarily preferred to employ a solvent same as the carrier liquid as described above in the stage of the preparation of a resin dispersion. Therefore, a straight chain or branched aliphatic hydrocarbon, an alicyclic hydrocarbon, an aromatic hydrocarbon and a halogenated hydrocarbon are preferably used.

The monofunctional monomer (A) for use in the present invention may be any monofunctional monomer as far as it is soluble in a nonaqueous solvent, but insolubilized by polymerization. Specific examples thereof include a monomer represented by the following formula (IV):

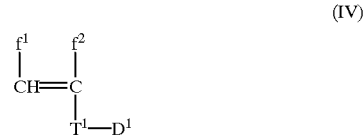

(IV)

wherein $T^1$ represents —COO—, —OCO—, —CH$_2$OCO—, —CH$_2$COO—, —O—, —CONHCOO—, —CONHOCO—, —SO$_2$—, —CON(W$_1$)—, —SO$_2$N(W$_1$)— or a phenylene group (phenylene group being hereinafter described as "-Ph-" sometimes, and including 1,2-, 1,3- and 1,4-phenylene groups), in which W$_1$ represents a hydrogen atom or an aliphatic group having from 1 to 8 carbon atoms which may be substituted (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, or 3-methoxypropyl);

$D^1$ represents a hydrogen atom or an aliphatic group having from 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, or dichlorohexyl); and $f^1$ and $f^2$, which may be the same or different, each has the same meaning as defined for $a^1$ or $a^2$ in the formula (I).

Specific examples of the monofunctional monomer (A) include a vinyl ester or allyl ester of an aliphatic carboxylic acid having from 1 to 6 carbon atoms such as acetic acid, propionic acid, butyric acid, monochloroacetic acid, or trifluoropropionic acid; an alkyl ester or amide having from 1 to 4 carbon atoms which may be substituted of an unsaturated carboxylic acid such as acrylic acid, methacrylic acid, crotonic acid, itaconic acid or maleic acid (the alkyl group including, for example, methyl, ethyl, propyl, butyl, 2-chloroethyl, 2-bromoethyl, 2-fluoroethyl, trifluoroethyl, 2-hydroxyethyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl and 2-carboxyamidoethyl); a styrene derivative (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, or vinylbenzenesulfoamide); an unsaturated carboxylic acid (e.g., acrylic acid, methacrylic acid, crotonic acid, maleic acid or itaconic acid); a cyclic acid anhydride of maleic acid or itaconic acid; an acrylonitrile; a methacrylonitrile; and a heterocyclic compound having a polymerizable double bond group (for example, compounds described in "Polymer Data Handbook, —Fundamental Volume—", edited by Kobunshi Gakkai, pages 175 to 184, Baifukan (1986), specifically, N-vinylpyridine, N-vinylimidazole, N-vinylpyrrolidone, vinylthiophene, vinyltetrahydrofuran, vinyloxazoline, vinylthiazole, or N-vinylmorpholine).

Two or more kinds of monomers (A) may be used in combination.

The monomer (C) having the specific substituent which is employed together with the monomer (A) according to the present invention is a monomer represented by the following formula (I):

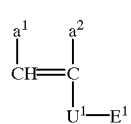

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (III):

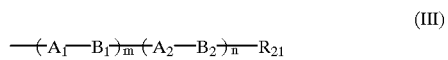

wherein $R_{21}$ represents a hydrogen atom or an aliphatic group having from 1 to 18 carbon atoms;

$B_1$ and $B_2$, which may be the same or different, each represents —O—, —S—, —CO—, —CO$_2$—, —OCO—, -SO$_2$—, —N(R$_{22}$)—, —CON(R$_{22}$)—, —N(R$_{22}$)CO—, —N(R$_{22}$)SO$_2$—, —SO$_2$N(R$_{22}$)—, —NHCO$_2$— or —NHCONH—, in which $R_{22}$ has the same meaning as defined for $R_{21}$;

$A_1$ and $A_2$, which may be the same or different, each represents at least one group selected from the group consisting of a group represented by the following formula (IIIa) and a hydrocarbon group having from 1 to 18 carbon atoms, which each may be substituted, provided that, in the case of two or more, it represents a combination of the group represented by the formula (IIIa) and/or the hydrocarbon group:

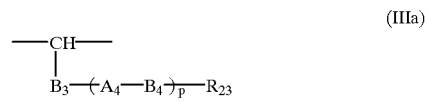

wherein $B_3$ and $B_4$, which may be the same or different, each has the same meaning as defined for $B_1$ or $B_2$;

$A_4$ represents a hydrocarbon group having from 1 to 18 carbon atoms which may be substituted;

$R_{23}$ has the same meaning as defined for $R_{21}$; and m, n and p, which may be the same or different, each represents an integer of from 0 to 4, provided that m and n are not 0 at the same time;

$U^1$ represents —COO—, —CONH—, —CON(E$_2$)—, —OCO—, —CONHCOO—, —CH$_2$COO—, —(CH$_2$)$_s$OCO—, —O—, —C$_6$H$_4$— or —C$_6$H$_4$—COO—, in which $E_2$ represents an aliphatic group or a substituent represented by the formula (III) described above, and s represents an integer of from 1 to 4; and $a^1$ and $a^2$, which may be the same or different, each represents a hydrogen atom, a halogen atom, a cyano group, an alkyl group, —COO—E$_3$ or —CH$_2$COO—E$_3$, in which $E_3$ represents an aliphatic group.

First, the case where $E^1$ represents an aliphatic group having 8 or more carbon atoms is described in detail below.

$E^1$ preferably represents an alkyl group having a total number of carbon atoms of 10 or more which may be substituted, or an alkenyl group having a total number of carbon atoms of 10 or more which may be substituted. Examples thereof include a decyl group, a dodecyl group, a tridecyl group, a tetradecyl group, a pentadecyl group, a hexadecyl group, a heptadecyl group, an octadecyl group, a docosanyl group, an eicosanyl group, a decenyl group, a dodecenyl group, a tridecenyl group, a tetradecenyl group, a hexadecenyl group, an octadecenyl group, a dococenyl group, a linoleyl group and an oleyl group. A substituent therefor includes a halogen atom (e.g., fluorine, chlorine, or bromine), a hydroxyl group, a cyano group, and an alkoxy group (e.g., methoxy, ethoxy, propoxy, or butoxy).

$U^1$ preferably represents —COO—, —CONH—, —CON(E$_2$)—, (in which $E_2$ preferably represents an aliphatic group having from 1 to 22 carbon atoms (examples of the aliphatic group including an alkyl group, an alkenyl group and an aralkyl group)), —OCO—, —CH$_2$OCO— or —O—. More preferably, $U^1$ represents —COO—, —CONH— or —CON(E$_2$)—.

$a^1$ and $a^2$, which may be the same or different, each preferably represents a hydrogen atom, a halogen atom (e.g., fluorine, chlorine, or bromine), a cyano group, an alkyl group having from 1 to 3 carbon atoms, —COO—E$_3$ or —CH$_2$COO—E$_3$ (in which $E_3$ preferably represents an aliphatic group having from 1 to 22 carbon atoms, for example, methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl, dodecenyl, tetradecenyl, hexadecenyl, or octadecenyl). The aliphatic group may have a substituent same as set forth for $E^1$ described above.

More preferably, $a^1$ and $a^2$ each represents a hydrogen atom, an alkyl group having from 1 to 3 carbon atoms (e.g., methyl, ethyl, or propyl), -COO-$E_3$ or —CH$_2$COO—$E_3$ (in which $E_3$ is more preferably an alkyl group having from 1 to 12 carbon atoms or an alkenyl group having from 2 to 12 carbon atoms, for example, methyl, ethyl, propyl, butyl, hexyl, octyl, decyl, dodecyl, pentenyl, hexenyl, heptenyl, octenyl, or decenyl), and the alkyl group or the alkenyl group may have a substituent same as set forth for $E^1$ described above.

When $E^1$ represents an aliphatic group having 8 or more carbon atoms in the monomer (C) represented by the formula (I) as described above, specific examples thereof include an ester of an unsaturated carboxylic acid such as acrylic acid, α-fluoroacrylic acid, α-chloroacrylic acid, α-cyanoacrylic acid, methacrylic acid, crotonic acid, maleic acid and itaconic acid having an aliphatic group having a total number of carbon atoms of from 10 to 32 (the aliphatic group may have a substituent such as a halogen atom, a hydroxyl group, an amino group or an alkoxy group, or a heteroatom such as an oxygen atom, a sulfur atom or a nitrogen atom may intervene a carbon—carbon bond of its main chain) (examples of the aliphatic group including decyl, dodecyl, tridecyl, tetradecyl, pentadecyl, hexadecyl, octadecyl, docosanyl, decenyl, dodecenyl, tridecenyl, tetradecenyl, hexadecenyl, oleyl, linoleyl and docosenyl); an amide of the above-described unsaturated carboxylic acid (the aliphatic group has the same meaning as defined for the ester); a vinyl ester or allyl ester of a higher fatty acid (examples of the higher fatty acid including lauric acid, myristic acid, stearic acid, oleic acid, linoleic acid and behenic acid); and a vinyl ether substituted with an aliphatic group having a total number of carbon atoms of from 10 to 32 (the aliphatic group has the same meaning as defined for the unsaturated carboxylic acid described above).

Now, the case where $E^1$ represents a substituent having a total number of atoms of 8 or more (excluding a hydrogen atom directly attached to a carbon or nitrogen atom) represented by the formula (III) in the monomer (C) represented by the formula (I) is described in detail below.

$A_1$ and $A_2$ each represents at least one group selected from the group consisting of a group represented by the formula (III) and a hydrocarbon group having from 1 to 18 carbon atoms (in the case of two or more, each represents a combination of the group represented by the formula (III) and/or the hydrocarbon group). More specifically, $A_1$ and $A_2$ each is composed of any appropriate combination of atomic groups such as —C($R_{24}$)($R_{25}$)— (in which $R_{24}$ and $R_{25}$ each represents a hydrogen atom, an alkyl group or a halogen atom), —(CH=CH)—, a cyclohexylene group (the cyclohexylene group is hereinafter often represented by "—C$_6$H$_{10}$—", including 1,2-, 1,3- and 1,4-cyclohexylene groups) and the group represented by the formula (IIIa).

When $E^1$ represents the substituent having a total number of atoms of 8 or more represented by formula (III), it is preferred that a "connecting main chain" composed of $U^1$ to $R^{21}$ (namely, $U^1$, $A_1$, $B_1$, $A_2$, $B_2$ and $R_{21}$) in a connecting group (—$U^1$—($A_1$—$B_1$)$_m$—($A_2$—$B_2$)$_n$—$R_{21}$) in the formula (I) has a total number of atoms of 8 or more.

The number of atoms constituting the "connecting main chain" means that, for example, when $U^1$ represents —COO— or —CONH—, the oxo group (=O) and the hydrogen atom are not contained in the number of atoms, and the carbon atom, the ether type oxygen atom and the nitrogen atom constituting the connecting main chain are contained in the number of atoms. Therefore, in case of —COO— and —CONH—, the number of atoms is counted as 2. At the same time, when $R_{21}$ represents —C$_9$H$_{19}$, the hydrogen atoms are not contained in the number of atoms, and the carbon atoms are contained therein. In this case, therefore, the number of atoms is counted as 9.

When $U^1$ represents —CON($E_2$)—, and $E_2$ represents the substituent represented by the formula (III), namely —($A_1$—$B_1$)$_m$—($A_2$—$B_2$)$_n$—$R_{21}$, a connecting main chain composed of $E_2$ is also included in the above-described "connecting main chain". Furthermore, when $A_1$ and $A_2$ each has the group represented by formula (IIIa), a (—$B_3$—($A_4$—$B_4$)$_p$—$R_{23}$) group is also included in the above-described "connecting main chain".

Of the monomers (C) represented by the formula (I) as described above, specific examples of monomers wherein $E^1$ represents the substituent shown by the formula (III) include the following compounds.

In the following formulae (1) to (19), $r_1$ represents —H, —CH$_3$, —Cl or —CN, $r_2$ represents —H or —CH$_3$, l represents an integer of from 2 to 10, p represents an integer of from 2 to 6, q represents an integer of from 2 to 4, m represents an integer of from 1 to 12, and n represents an integer of from 4 to 18.

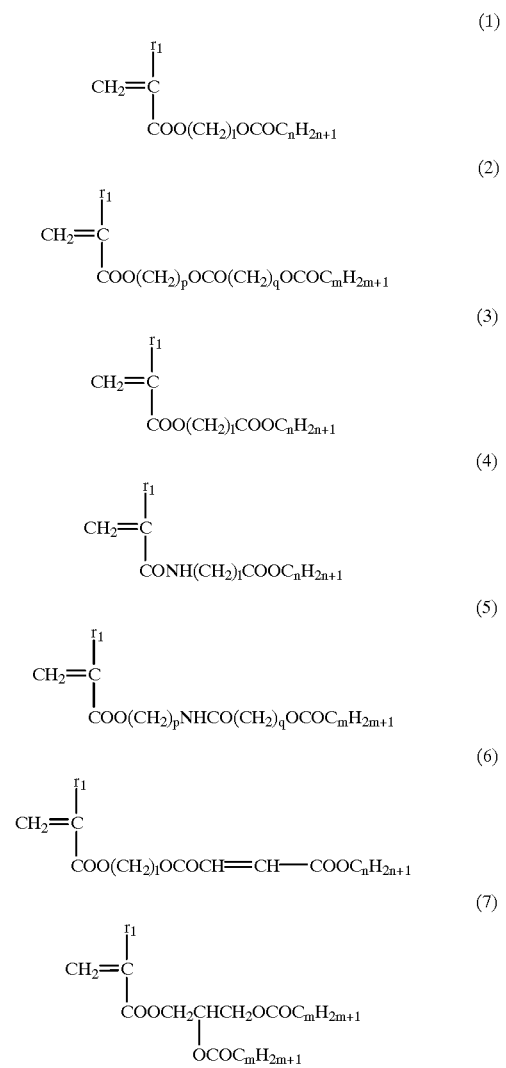

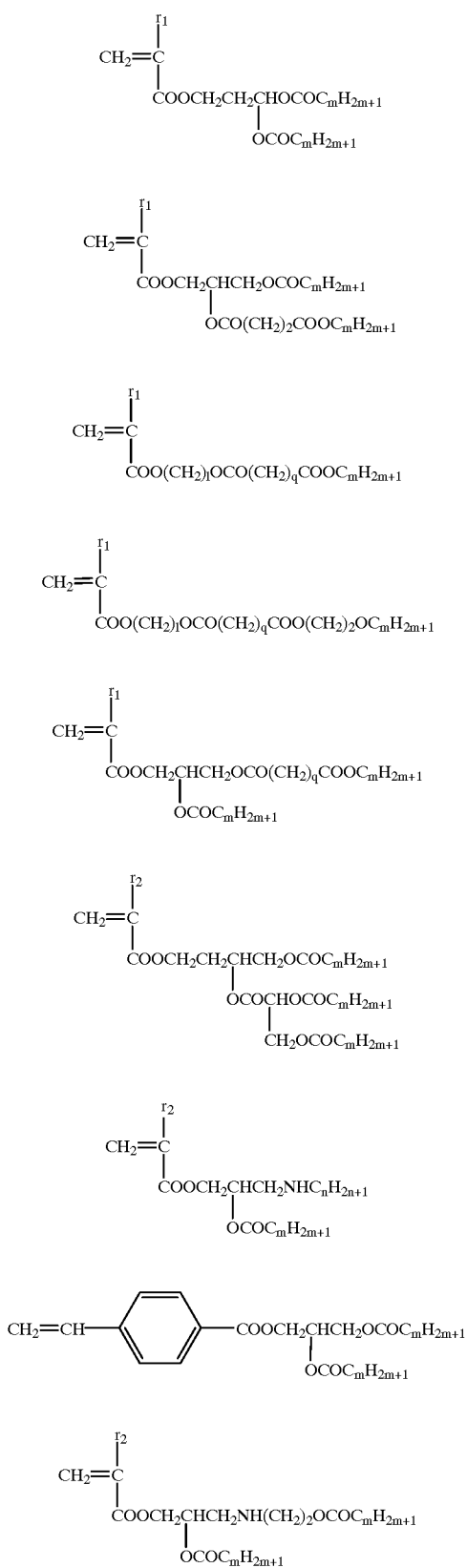

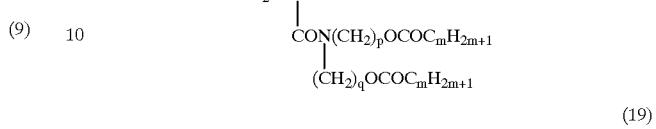

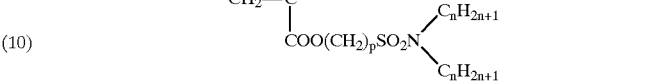

The resin for dispersion stabilization (P) according to the present invention which is employed for making a polymer insoluble in the nonaqueous solvent formed by polymerization of the monomers a stable resin dispersion in the nonaqueous solvent is a random copolymer soluble in the nonaqueous solvent containing a copolymer component which works for solubilizing the random copolymer in the nonaqueous solvent (hereinafter referred to component X sometimes) and a copolymer component having a double bond group copolymerizable with the monomer (A) at a terminal of the side chain thereof (hereinafter referred to component Y sometimes) and represented by the following formula (II):

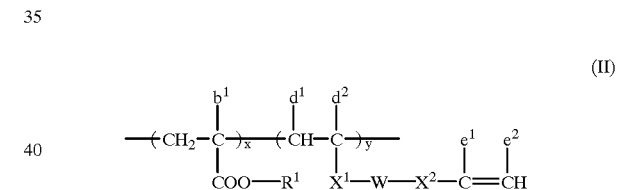

In the formula (II), $R^1$ represents an alkyl group having from 10 to 32 carbon atoms or an alkenyl group having from 10 to 32 carbon atoms, each of which may be a straight chain or branched. Specific examples thereof include a decyl group, a dodecyl group, a tridecyl group, a tetradecyl group, a pentadecyl group, a hexadecyl group, an octadecyl group, an eicosanyl group, a decenyl group, a dodecenyl group, a tridecenyl group, a hexadecenyl group, an octadecenyl group, an eicosenyl group, docosenyl group, and a linoleyl group.

$b^1$ represents a hydrogen atom or an alkyl group having from 1 to 4 carbon atoms (e.g., methyl, ethyl, propyl, or butyl), and preferably a hydrogen atom or a methyl group.

$X^1$ and $X^2$, which may be the same or different, each has the same meaning as defined for $U^1$ in the formula (I).

W represents a group connecting $X^1$ and $X^2$ and comprising a carbon atom or a hetero atom selected from an oxygen atom, a sulfur atom, a silicon atom and a nitrogen atom.

The connecting group includes a carbon atom-carbon atom bond (either a single bond or a double bond), a carbon atom-hetero atom bond (the hetero atom including an oxygen atom, a sulfur atom, a silicon atom and a nitrogen atom), a hetero atom-hetero atom bond, a heterocyclic group and an appropriate combination thereof. Specific examples thereof include

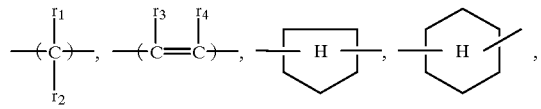

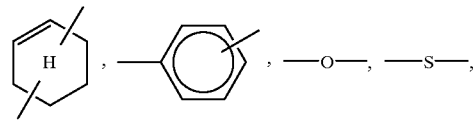

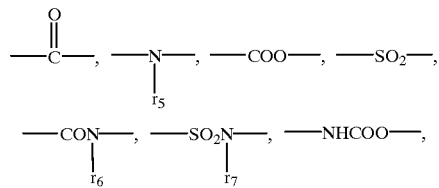

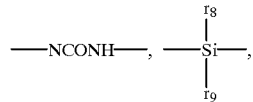

wherein $r_1$, $r_2$, $r_3$ and $r_4$, which may be the same or different, each represents a hydrogen atom, a halogen atom (e.g., fluorine, chlorine, or bromine), a cyano group, a hydroxy group or an alkyl group (e.g., methyl, ethyl, or propyl);

$r_5$, $r_6$ and $r_7$, which may be the same or different, each represents a hydrogen atom or an alkyl group (e.g., methyl, ethyl, propyl, or butyl); and $r_8$ and $r_9$, which may be the same or different, each represents a hydrogen atom, a hydrocarbon group having from 1 to 8 carbon atoms (e.g., methyl, ethyl, propyl, butyl, pentyl, hexyl, benzyl, phenethyl, phenyl, or tolyl) or —$Or_{10}$ (wherein $r_{10}$ represents a hydrocarbon group having from 1 to 8 carbon atoms (e.g., methyl, ethyl, propyl, butyl, pentyl, hexyl, benzyl, phenethyl, phenyl, or tolyl)).

The heterocyclic group for the connecting group is derived from a heterocyclic ring containing a hetero atom, for example, an oxygen atom, a sulfur atom or a nitrogen atom (e.g., thiophene, pyridine, pyrane, imidazole, benzimidazole, furan, piperidine, pyrazine, pyrrole, or piperazine).

The connecting chain group represented by —$X^1$—W—$X^2$— contained in the component Y of the formula (II) preferably contains a total number of atoms of 8 or more. The number of atoms constituting the connecting chain group means that, for example, when $X^1$ represents —COO— or —CONH—, the oxo group (=O) and the hydrogen atom are not contained in the number of atoms, and the carbon atom, the ether type oxygen atom and the nitrogen atom constituting the connecting chain group are contained in the number of atoms. Therefore, in case of —COO— —CONH—, the number of atoms is counted as 2.

Specific examples of the component Y having a polymerizable double bond are set forth below, but the present invention should not be construed as being limited thereto. In the following formulae (Y-1) to (Y-12), $d^1$ represents —H or —$CH_3$, $d^2$ represents —H, —$CH_3$, —Cl or —CN, $k_1$ represents an integer of from 4 to 12, $k_2$ represents an integer of from 2 to 6, $L^1$ represents

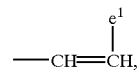

—$CH_2CH=CH_2$ or

(wherein $e^1$ represents —H or —$CH_3$), and $L^2$ represents

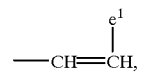

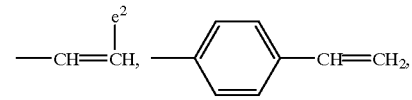

or —$CH_2CH=CH_2$ (wherein $e^2$ represents —$CH_3$, —Cl or —CN).

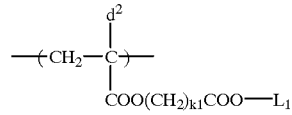 (Y-1)

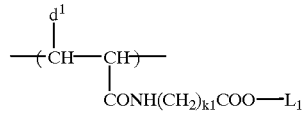 (Y-2)

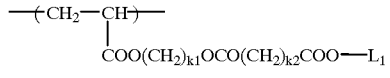 (Y-3)

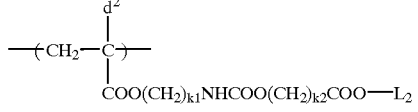 (Y-4)

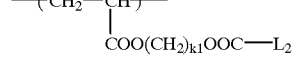 (Y-5)

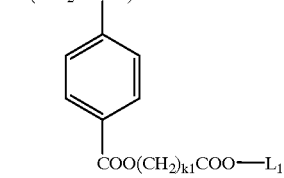 (Y-6)

(Y-7)
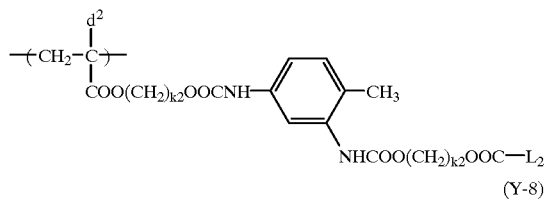

(Y-8)
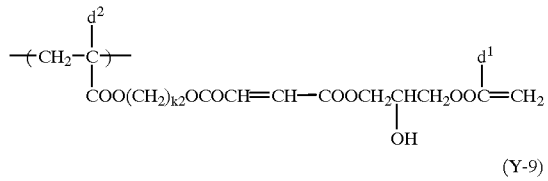

(Y-9)
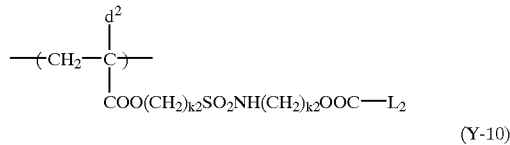

(Y-10)
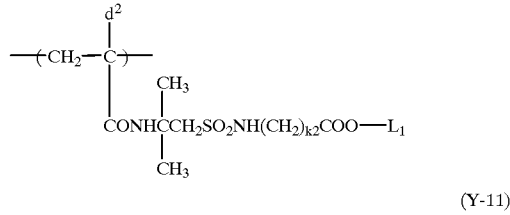

(Y-11)
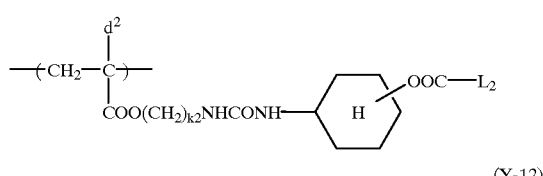

(Y-12)
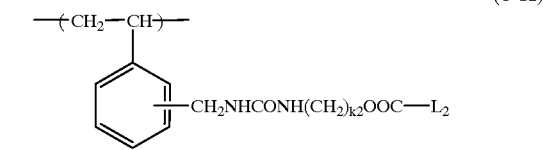

The resin for dispersion stabilization (P) according to the present invention can be easily prepared by means of conventionally known synthesis methods. More specifically, in order to introduce a copolymer component having a polymerizable double bond group (component Y), there is a method in which a polymerization reaction is first conducted using a monomer having a specific reactive group, for example, —OH, —COOH, —SO$_3$H, —NH$_2$, —SH, —PO$_3$H$_2$, —NCO, —NCS, —COCl, —SO$_2$Cl or an epoxy group and a monomer corresponding to the component X in the formula (II), and then a reagent having a polymerizable double bond group is reacted with the resulting copolymer, thereby introducing the polymerizable double bond group into the copolymer by a polymer reaction.

Specifically, the polymerizable double bond group can be introduced according to methods described, for example, in P. Dreyfuss & R. P. Quirk, *Encycl. Polym. Sci. Eng.*, 7, 551 (1987), Yoshiki Nakajyo & Yuya Yamashita, *Senryo to Yakuhin*, 30, 232 (1985), Akira Ueda & Susumu Nagai, *Kagaku to Kogyo*, 60, 57 (1986), P. F. Rempp & E. Franta, *Advance in Polymer Science*, 58, 1 (1984), Koichi Ito, *Kobunshi Kako*, 35, 262 (1986), V. Percec, *Applied Polymer Science*, 285, 97 (1984), and literature references cited therein.

Another method in which a bifunctional monomer having functional groups having different reactivity in a radical polymerization is subjected to copolymerization reaction with a monomer corresponding to the component X to prepare a copolymer represented by the formula (II) without the occurrence of gelation as described in JP-A-60-185962 is also utilized.

In the resin represented by the formula (II), a weight ratio of component X/component Y is from 90/10 to 99/1, preferably from 92/8 to 98/2. In such a range of the weight ratio, the occurrence of gelation in the reaction mixture and the formation of coarse resin particles may be prevented, and the dispersion stability and redispersibility of the dispersed resin particles are excellent.

The resin for dispersion stabilization (P) according to the present invention may contain, as a copolymer component, a repeating unit other than the repeating units corresponding to the components X and Y respectively. The copolymer component to be included may be selected from any monomers copolymerizable with the monomers corresponding to the repeating units shown in the formula (II). Such monomers, however, are preferably employed in a range of not more than 20 parts by weight based on 100 parts by weight of the total copolymer components. When the amount of other monomers exceeds the above-described range, the dispersion stability of the dispersed resin particles may tend to deteriorate.

The resin for dispersion stabilization (P) used in the present invention is soluble in an organic solvent, and specifically, it is preferably dissolved in an amount of at least 5 parts by weight based on 100 parts by weight of toluene at a temperature of 25° C.

The weight average molecular weight of the resin for dispersion stabilization (P) according to the present invention is preferably from $2\times10^4$ to $10\times10^6$, more preferably from $3\times10^4$ to $2\times10^5$.

The dispersed resin according to the present invention comprises at least one of the monomer (A) and at least one of the monomer (C), and it is important that the resin synthesized from these monomers is insoluble in a nonaqueous solvent, thereby being able to obtain the desired dispersed resin.

The total amount of the monomer (A) and the monomer (C) is preferably from 10 parts to 100 parts by weight, more preferably from 10 parts to 80 parts by weight, based on 100 parts by weight of the nonaqueous solvent. With respect to a ratio of each of the monomers, the monomer (C) represented by the formula (I) is used preferably in an amount of from 0.1% to 10% by weight, more preferably 0.2% to 8% by weight, based on the monomer (A) used.

The resin for dispersion stabilization (P) is used preferably in an amount of from 1 to 25 parts by weight, more preferably 5 to 20 parts by weight, based on 100 parts by weight of the total amount of the monomers.

The dispersed resin particles used in the present invention are generally prepared by heat polymerization of the resin for dispersion stabilization (P), the monomer (A) and the monomer (C) as described above in the nonaqueous solvent in the presence of a polymerization initiator such as benzoyl peroxide, azobisisobutyronitrile or butyllithium. Specifically, there are (1) a method of adding a polymerization initiator to a mixed solution of the resin for dispersion stabilization (P), the monomer (A) and the monomer (C), (2) a method of adding dropwise the monomer (A) and the monomer (C) together with a polymerization initiator to a solution in which the resin for dispersion stabilization (P) is dissolved, (3) a method of adding a polymerization initiator and the remainders of the monomer (A) and the monomer (C) to a mixed solution containing the total amount of the resin for dispersion stabilization (P) and appropriate parts of the monomer (A) and the monomer (C), and (4) a method of adding a mixed solution of the resin for dispersion stabilization (P), the monomer (A) and the monomer (C) to a nonaqueous solvent together with a polymerization initiator. The dispersed resin particles can be prepared according to any of these methods.

The amount of the polymerization initiator is suitably from 0.1% to 10% by weight based on the total amount of monomers used. The polymerization temperature is preferably from about 40° C. to about 180° C., and more preferably from 50° C. to 120° C. The reaction time is preferably from 3 hours to 15 hours.

When the polar solvent described above, such as an alcohol, a ketone, an ether or an ester is used in combination with the nonaqueous solvent used in the reaction, or when unreacted monomers of the monomer (A) and the monomer (C) to be subjected to polymerization granulation remain, it is preferred that the polar solvent or the unreacted monomers are removed by distillation under heating to temperature equal to or higher than a boiling point of the solvent or the monomers, or under a reduced pressure.

The nonaqueous dispersed resin particles according to the present invention prepared as described above are present as particles which are very fine and uniform in particle size distribution. The average particle size thereof is from 0.08 $\mu$m to 0.8 $\mu$m, more preferably from 0.1 $\mu$m to 0.5 $\mu$m. The particle size can be determined using CAPA-500 (trade name, manufactured by Horiba Ltd.).

The weight average molecular weight of the dispersed resin according to the present invention is preferably from $5 \times 10^3$ to $1 \times 10^6$, more preferably from $8 \times 10^3$ to $5 \times 10^5$.

As to thermal properties, the dispersed resin according to the present invention has preferably a glass transition point ranging from 15° C. to 80° C. or a softening point ranging from 35° C. to 120° C., preferably a glass transition point ranging from 20° C. to 60° C. or a softening point ranging from 38° C. to 90° C.

Within the range as described above, the dispersed resin particles of the oil-based ink of the present invention are excellent in dispersion stability, redispersibility and storage stability. Also, rapid fixing property after image formation is good, the image formed is retained in printing, thereby exhibiting good press life.

More specifically, since it has very stable dispersibility, even when it is repeatedly used in a recording device for a long period of time, it is good in dispersibility and easily redispersed, so that contamination due to adhesion of the resin particles to each part of the device is not observed at all.

Furthermore, due to its good fixing property, a strong coating is formed on a hydrophilic outermost surface of a lithographic printing plate precursor by a rapid fixing treatment with heating after ink image formation. This makes it possible to print a large number of sheets (good press life) in offset printing.

The oil-based ink of the present invention having the effects as described above becomes available by a nonaqueous latex of the dispersed resin particles according to the present invention.

In the dispersed resin particles of the present invention, the resin for dispersion stabilization (P) is chemically bonded to the insoluble resin particles at the time of polymerization granulation. The resin (P) which is bonded to the resin particle is soluble in the nonaqueous solvent, and thus it brings about a so-called steric repulsion effect.

In addition, the monomer (C) having the specific substituent is copolymerized with the monomer (A) to be insolubilized at the time of polymerization granulation. The specific substituent moiety contained in the monomer (C) is designed so as to improve the affinity for the nonaqueous solvent, since particles are formed by nonaqueous dispersion polymerization. It is therefore orientated in the interface (surface) area of the particle rather than it gets into the inside of the particle, because of its good solvent affinity for the dispersion medium. It is presumed that as a result, the affinity for the dispersion medium on the particle surface is improved by using the monomer (C) together with the resin for dispersion stabilization (P) to significantly enhance the effect of preventing aggregation of the resin particles.

Consequently, it is believed that aggregation and precipitation of the insoluble resin particles are inhibited, thereby remarkably improving the redispersibility.

It is preferred that the oil-based ink used in the present invention contains a coloring material as a color component for visual inspection of a printing plate after plate making, in addition to the above-described dispersed resin particles.

As the coloring material, any can be used as far as it is a pigment or a dye conventionally employed in an oil-based ink or a liquid developer for electrostatic photography.

The pigments which can be used include those ordinarily employed in the technical field of printing, regardless of inorganic pigments or organic pigments. Specifically, known pigments, for example, carbon black, cadmium red, molybdenum red, chrome yellow, cadmium yellow, Titan Yellow, chromium oxide, pyridian, Titan Cobalt Green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments can be used without particular limitation.

Preferred examples of the dyes include oil-soluble dyes, for example, azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

These pigments and dyes may be used individually or in an appropriate combination. They are preferably employed within the range of from 0.05% to 5% by weight based on the whole ink.

The coloring material may be dispersed by itself in the nonaqueous solvent as dispersed particles, separately from the dispersed resin particles, or included in the dispersed resin particles. In order to include the coloring material in the dispersed resin particles, there is a method in which the dispersed resin is dyed with an appropriate dye as described in JP-A-57-48738. Alternatively, there is a method in which the dispersed resin is chemically bonded to a dye as described in JP-A-53-54029, or a method in which a monomer previously containing a dye is used at the time of polymerization granulation to form a dye-containing copolymer as described in JP-B-44-22955 (the term "JP-B" as used herein means an "examined Japanese patent publication").

The dispersed resin particles and the colored particles (or coloring material particles) contained in the oil-based ink of the present invention are preferably electroscopic particles positively or negatively charged.

In order to impart the electroscopicity to the particles, the technology of a liquid developer for electrostatic photography can be appropriately utilized. Specifically, it is carried out using electroscopic materials, for example, charge control agents and other additives as described, for example, in "Recent Developments and Utilization of Electrophotographic Development Systems and Toner Materials", pages 139 to 148, "Fundamental and Application of Electrophotographic Techniques", edited by Denshi Shashin Gakkai, pages 497 to 505 (Corona, 1988), and Yuji Harazaki, "Electrophotography", 16 (No. 2), page 44 (1977).

Suitable compounds are also described, for example, in British Patents 893,429 and 934,038, U.S. Pat. Nos. 1,122,397, 3,900,412 and 4,606,989, JP-B-4-51023, JP-B-6-19595, JP-B-6-19596, JP-B-6-23865, JP-A-60-185963 and JP-A-2-13965.

Charge control agents are preferably added in an amount of from 0.001 part to 1.0 part by weight based on 1000 parts by weight of dispersing medium or a carrier liquid. Various additives may be further added if desired, and the upper limit of the total amount of these additives is restricted by the electric resistance of the oil-based ink. Specifically, if the electric resistance of the ink in a state of excluding the dispersed particles therefrom is lower than $10^9$ Ωcm, it may be difficult to obtain continuous gradation images of good quality. It is therefore desired to control the amount of each additive added within the above described limit.

The oil-based ink containing the electroscopic resin particles of the present invention is preferably employed in the ink jet recording method of the electric field controlling system in which the ink is discharged using electrostatic attraction, since the discharge of the oil-based ink from a nozzle is easily performed.

Now, the method for the preparation of a lithographic printing plate according to the present invention is described in detail below.

The lithographic printing plate precursor having a lithographically printable hydrophilic surface used in the method of the present invention may be any as far as it provides a hydrophilic surface suitable for lithography, and printing pate precursors used for conventional offset printing plates can be used.

The surface for receiving the ink image is a hydrophilic surface preferably having a contact angle with water of 5 degrees or less, more preferably 0 degree, to provide prints without the generation of ink stains in the non-image areas.

A lithographic printing plate precursor comprising a water-resistant support having provided thereon an image receiving layer having a lithographically printable hydrophilic surface is preferably employed in the present invention. Also, an aluminum plate a surface of which has been rendered hydrophilic, or a plate comprising a water-resistant support having provided thereon an aluminum layer a surface of which has been rendered hydrophilic is also preferably used as the printing plate precursor.

Examples of the water-resistant support include a plastic sheet, paper for which printing durability is provided, an aluminum plate, a zinc plate, a bimetal plate (e.g., a copper-aluminum plate, a copper-stainless steel plate and a chromium-copper plate), a trimetal plate (e.g., a chromium-copper-aluminum plate, a chromium-lead-iron plate, and a chromium-copper-stainless steel plate), preferably having a thickness of from 0.1 to 3 mm, particularly preferably from 0.1 to 1 mm.

Also, paper having a thickness of from 80 μm to 200 μm subjected to water-resistant treatment, paper or a plastic film laminated with a plastic film or a metal foil, is employed.

It is preferred that the water-resistant support has electroconductivity, more specifically, a specific electric resistance of $10^{10}$ Ωcm or less at least at an area directly under the image receiving layer. The specific electric resistance is more preferably $10^8$ Ωcm or less. The smaller the specific electric resistance, the better.

In order to provide the specific electric resistance of at least an area directly under the image receiving layer on a substrate such as paper and a film, for example, a layer comprising an electroconductive filler such as carbon black and a binder is applied thereto, a metal foil is stuck thereon, and a metal is evaporated thereon.

On the other hand, examples of the support having an electroconductivity as a whole include electroconductive paper to which sodium chloride is impregnated, a plastic film into which an electroconductive filler is incorporated, and a metal plate such as aluminum.

In the above-described range of electroconductivity, when ink droplets which have been charged in ink jet recording of electric field controlling type are adhered to the image-receiving layer, the charge of the ink droplets is disappeared quickly through earth, and a clear image having no disorder is formed.

In the present invention, the specific electric resistance (volume specific electric resistance or electric resistivity) was measured by a three-terminal method using a guard electrode according to the method described in JIS K-6911.

As to the support used in the present invention, the smoothness of a surface on the side adjacent to the image receiving layer is preferably adjusted to 300 (second/10 ml) or more by the Bekk smoothness.

The image reproducibility and the press life can be further improved by restricting the smoothness of the surface on the side adjacent to the image receiving layer of the support to the above described value. Such an improving effect is obtained even if the image receiving layer having the same surface smoothness is used, and it is considered that an increase in the smoothness of the surface of the support has improved adhesion between the image area and the image receiving layer.

In the present invention, the smoothness of the surface of the image receiving layer is preferably 50 (second/10 ml) or more, and more preferably 80 (second/10 ml) or more, by the Bekk smoothness.

Defects and blurs of ink images which may be formed according to the unevenness of the image receiving layer are preferably inhibited at the Bekk smoothness of 50 or more.

The Bekk smoothness can be measured with a Bekk smoothness tester. The Bekk smoothness tester is a tester for measuring a time required for a definite amount (10 ml) of air to pass through between a test piece and a glass surface under a reduced pressure, wherein the test piece is pressed to a highly smoothly finished circular glass plate having a hole at its center at a definite pressure (1 kg/cm$^2$).

The water-resistant support having electro-conductivity as a whole used in the present invention is described in more detail below.

For instance, the support is obtained by providing both sides of an electroconductive paper obtained by impregnating sodium chloride into a substrate with a water-resistant electroconductive layer.

In the present invention, the paper used for the substrate include wood pulp paper, synthetic pulp paper and mixed paper of wood pulp and synthetic pulp. The thickness of the paper is preferably from 80 μm to 200 μm.

The electroconductive layer is described in more detail below.

The electroconductive layer is formed by applying a composition containing an electroconductive filler and a binder to both surfaces of the electroconductive paper. The thickness of the electroconductive layer is preferably from 5 µm to 20 µm.

The electroconductive filler includes granulated carbon black, graphite, metal powder (e.g., silver powder, copper powder, a nickel powder), stannic oxide powder, aluminum flake, nickel flake, carbon fiber, brass, aluminum, copper and stainless steel.

A resin used for the binder can be appropriately selected from various resins. Specifically, the resin includes a hydrophobic resin (e.g., acrylic resin, vinyl chloride resin, styrene resin, styrene-butadiene resin, styrene-acrylic resin, urethane resin, vinylidene chloride resin, and vinyl acetate resin) and a hydrophilic resin (e.g., polyvinyl alcohol resin, cellulose derivative resin, starch and derivatives thereof, polyacrylamide resin, and styrene-maleic anhydride copolymer).

The electroconductive layer can also be formed by laminating an electroconductive thin film. Examples of the electroconductive thin film include a metal foil and an electroconductive plastic film. More specifically, the metal foil laminating material includes an aluminum foil, and the electroconductive plastic film laminating material includes a polyethylene resin to which carbon black is incorporated. The aluminum foil may be any of hard type and soft type, and the thickness thereof is preferably from 5 µm to 20 µm.

The polyethylene resin laminate film containing carbon black is preferably obtained using an extrusion laminating method. The method comprises melting polyolefin by heating, forming a film, immediately pressing the film on paper, and cooling it for laminating. Various apparatus are known for conducting the method. The thickness of the laminate layer is preferably from 10 µm to 30 µm. As the support having an electroconductivity as a whole, a plastic film having an electroconductivity and a metal sheet can be used as they are as far as the water-resistivity is satisfied.

The plastic film having an electroconductivity includes a polypropylene or polyester film to which an electroconductive filer such as carbon fiber or carbon black is incorporated. The metal sheet includes aluminum. The thickness of the substrate is preferably from 80 µm to 200 µm. If it is less than 80 µm, mechanical strength as a printing plate may be insufficient. On the other hand, if it exceeds 200 µm, a handling property such as a transportability in a recording apparatus tends to decrease.

The support comprising a water-resistant substrate having provided thereon a layer having an electroconductivity is described in more detail below.

As the water-resistant substrate, those described above can be employed. In order to form an electroconductive layer on a water-resistant substrate, the methods as described in the formation of the support having an electroconductivity as a whole can be used. Specifically, one surface of the substrate is coated with a layer containing an electroconductive filer and a binder and having a thickness of from 5 µm to 20 µm, or laminated with a metal foil or a plastic film having an electroconductivity.

Furthermore, in addition to the methods described above, for example, a vacuum evaporated film of a metal such as aluminum, tin, palladium or gold may be provided on a plastic film.

According to the methods described above, the water-resistant support having a specific electric resistance of $10^{10}$ Ωcm or less as a whole of the support can be obtained.

An under layer may be provided on a surface of the support in order to further improve the water resistance of the support and to enhance adhesion between the support and the image receiving layer provided thereon. In this case, the surface smoothness of the under layer should be controlled in the range described above.

Also, a backcoat layer may be proved on a surface of the support opposite to the image receiving layer for preventing curling. When a resulting printing plate is mounted on an offset printing machine for printing, it is desired that the printing plate is accurately set on the printing machine without the occurrence of slide or slip. It is preferred that the backcoat layer has the Bekk smoothness of from 150 (second/10 ml) to 700 (second/10 ml).

The water-resistant support provided with the under layer and/or the backcoat layer is also referred to as the water-resistant support sometimes.

The under layer or the backcoat layer is formed by coating and drying or laminating a coating composition containing a resin, a pigment and other additive on the support. The resin can be appropriately selected from various resins. Specifically, they include those described for the electroconductive layer above.

Furthermore, the pigment includes clay, kaolin, talc, diatom earth, calcium carbonate, aluminum hydroxide, magnesium hydroxide, titanium oxide and mica. In order to attain the desired smoothness, the pigment is preferably used by appropriately selecting its grain size. For example, when a relatively high smoothness is required in the under layer, pigment from which small-sized and large-sized grains are cut off, specifically, having a grain size of about 0.5 µm to about 10 µm is preferably used. The pigment described above is preferably used at a ratio of 80 parts to 200 parts by weight in the backcoat layer based on 100 parts by weight of resin. In order to obtain excellent water resistance, the under layer and the backcoat layer effectively contain a water resistance imparting agent such as a melamine resin and a polyamide epichlorohydrin resin. The above-described grain size can be measured using a scanning electron microscopic (SEM) photograph. When the grain is not spherical, the size is a diameter determined by converting a projected area to a circle.

When the lithographic printing plate precursor is prepared according to the present invention, generally, a solution containing components for the under layer is applied onto one side of the support, followed by drying to form the under layer, if necessary, a solution containing components for the backcoat layer is further applied onto the other side of the support, followed by drying to form the backcoat layer, if necessary, and subsequently, a coating solution containing components for the image receiving layer is applied, followed by drying to form the image receiving layer. The coating amounts of the image receiving layer, the under layer and the backcoat layer are each suitably from 1 g/m² to 30 g/m², and preferably from 6 g/m² to 20 g/m².

More preferably, the thickness of the water-resistant support provided with the under layer and the backcoat layer ranges from 90 µm to 130 µm, and preferably from 100 µm to 120 µm.

The image receiving layer is provided on the water-resistant support, and the thickness thereof is preferably from 5 µm to 50 µm.

The image receiving layer comprises, for example, a water-soluble binder, an inorganic pigment and a water-resistance imparting agent as its main component. The binder includes a water-soluble resin, for example, PVA, modified PVA (e.g., carboxy modified PVA), starch and derivatives thereof, CMC, hydroxyethyl cellulose, casein, gelatin, polyvinylpyrrolidone, a copolymer of vinyl acetate and crotonic acid, and a copolymer of styrene and maleic acid.

The water resistance imparting agent includes glyoxal, a primary condensation product of a melamine formaldehyde resin or urea formaldehyde resin, a modified polyamide resin such as methylol polyamide resin, a polyamide-polyamine-epichlorohydrin resin, a polyamide-epichlorohydrin resin, and a modified polyamide-polyimide resin. Examples of the inorganic pigment include kaolin, clay, calcium carbonate, silica, titanium oxide, zinc oxide, barium sulfate, and alumina. Among these, silica is preferred.

In addition, the image receiving layer may contain a crosslinking catalyst such as ammonium chloride or a silane coupling agent.

A method for forming an image on the lithographic printing plate precursor as described above (hereinafter also referred to as a "master") is described below. One example of a device system suitable for performing such a method is shown in FIG. 1.

The device system shown in FIG. 1 comprises an ink jet recording device 1 using an oil-based ink.

As shown in FIG. 1, pattern information of images (figures or letters) to be formed on a master 2 is first supplied from an information supply source such as a computer 3 to the ink jet recording device 1 using oil-based ink through a transmittal means such as a path 4. A head for ink jet recording 10 of the recording device 1 stores oil-based ink therein, and sprays fine droplets of the ink on the master 2 according to the above-described information, when the master 2 passes through in the recording device 1, whereby the ink adheres to the master 2 in accordance with the above-described pattern.

Thus, the image formation on the master 2 is completed to obtain a printing plate.

Figure 2:
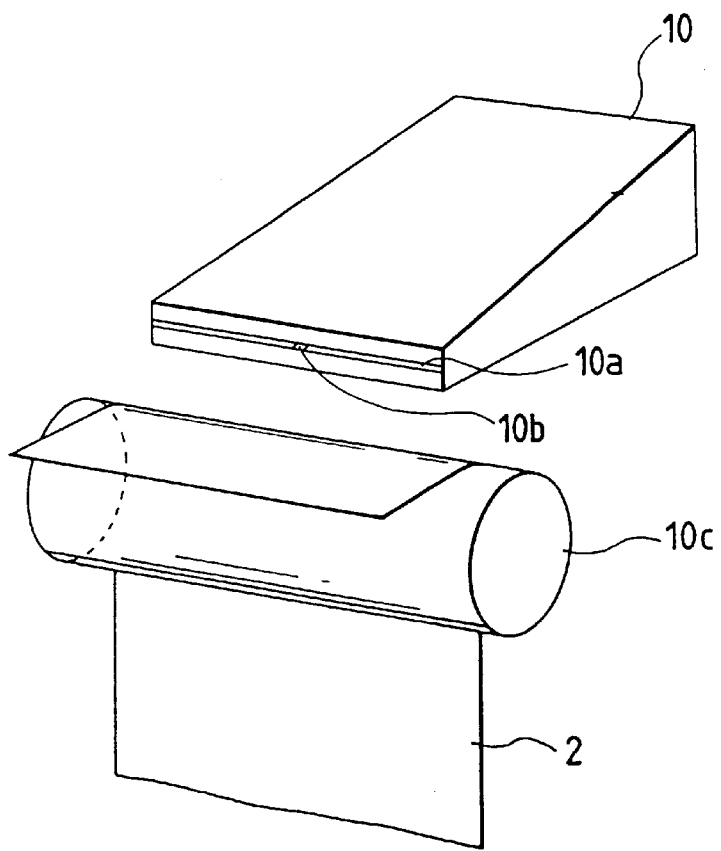
FIG. 2 is a schematic view showing a main part of an ink jet recording device which can be used in the present invention.
Figure 3:
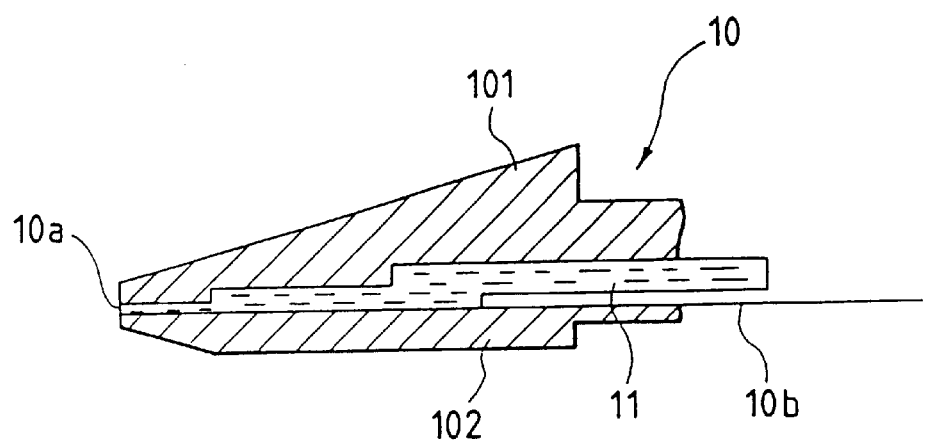
FIG. 3 is a partially sectional view showing a head of the ink jet recording device which can be used in the present invention.

Components of the ink jet recording device as shown in the device system of FIG. 1 are shown in FIG. 2 and FIG. 3, respectively. In FIG. 2 and FIG. 3, members common to the members in FIG. 1 are designated using the same symbols. FIG. 2 is a schematic view showing a main part of such an ink jet recording device, and FIG. 3 is a sectional view showing a part of the head.

The head 10 attached to the ink jet recording device has a slit between an upper unit 101 and a lower unit 102, a leading edge thereof forms a discharge slit 10a, a discharge electrode 10b is arranged in the slit, and the inside of the slit is filled with oil-based ink 11, as shown in FIG. 2 and FIG. 3.

In the head 10, voltage is applied to the discharge electrode 10b according to a digital signal of pattern information of image. As shown in FIG. 2, a counter electrode 10c is provided opposite to the discharge electrode 10b, and the master 2 is placed on the counter electrode 10c. The application of voltage forms a circuit between the discharge electrode 10b and the counter electrode 10c, and the oil-based ink 11 is discharged from the discharge slit 10a of the head 10, thereby forming images on the master 2 placed on the counter electrode 10c.

It is preferred that the width of the discharge electrode 10b is as narrow as possible in its leading edge, for forming images of high quality by printing.

For example, the head of FIG. 3 is filled with the oil-based ink, the discharge electrode 10b whose leading edge has a width of 20 μm is used, the distance between the discharge electrode 10b and the counter electrode 10c is adjusted to 1.5 mm, and a voltage of 3 kV is applied between these electrodes for 0.1 millisecond, whereby a 40 μm-dot can be formed on the master 2.

The present invention will be described in greater detail with reference to the following examples, but the present invention should not be construed as being limited thereto.

SYNTHESIS EXAMPLE 1 OF RESIN FOR DISPERSION STABILIZATION (P)

Synthesis of Resin for Dispersion Stabilization (P-1)

A mixed solution of 96 g of octadecyl methacrylate, 4 g of 4-(2-methacryloyloxyethyloxycarbonyl)butyric acid and 200 g of toluene was heated to a temperature of 75° C. under nitrogen gas stream with stirring. To the solution was added 1.5 g of 2,2'-azobis(isobutyronitrile) (abbreviated as AIBN) as a polymerization initiator, followed by reacting for 4 hours. Then, 0.8 g of AIBN was added to the reaction mixture and the reaction was further continued for 4 hours.

After cooling the reaction mixture to 25° C., 6 g of allyl alcohol was added with stirring and then a mixed solution of 10 g of dicyclohexylcarbodiimide (abbreviated as DCC), 0.1 g of 4-(N,N-diethylamino)-pyridine and 30 g of methylene chloride was dropwise added thereto over a period of one hour, followed by reacting for 3 hours.

To the reaction mixture was added 10 g of a 80% aqueous solution of formic acid and the resulting mixture was stirred for one hour. After removing the insoluble substance by filtration, the filtrate was reprecipitated in 2.5 liters of methanol. The resulting precipitate was collected by filtration and dissolved in 200 g of toluene. After removing the insoluble substance by filtration, the filtrate was reprecipitated in one liter of methanol. The resulting precipitate was collected by filtration and dried to obtain 70 g of the desired copolymer. A weight average molecular weight (Mw) thereof was $5 \times 10^4$. The weight average molecular weight (Mw) was measured by GPC method and calculated in terms of polystyrene (hereinafter the same).

Resin (P-1)

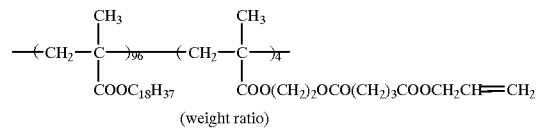

(weight ratio)

SYNTHESIS EXAMPLE 2 OF RESIN FOR DISPERSION STABILIZATION (P)

Synthesis of Resin for Dispersion Stabilization (P-2)

A mixed solution of 50 g of dodecyl methacrylate, 45 g of octadecyl acrylate, 5 g of glycidyl methacrylate and 200 g of toluene was heated to a temperature of 75° C. under nitrogen gas stream with stirring. To the solution was added 1.8 g of AIBN, followed by reacting for 4 hours. Then, 0.5 g of AIBN was added to the reaction mixture, followed by reacting for 3 hours, and further 0.3 g of AIBN was added thereto, followed by reacting for 3 hours.

To the reaction mixture were added 6 g of 3-acryloyloxypropionic acid, 1.0 g of N,N-dimethyldodecylamine and 0.5 g of tert-butylhydroquinone, and the mixture was stirred at a temperature of 100° C. for 10 hours. After cooling the reaction mixture, it was reprecipitated in 2 liters of methanol to obtain 82 g of the desired copolymer as white powder. A weight average molecular weight (Mw) thereof was $4 \times 10^4$.

Resin (P-2)

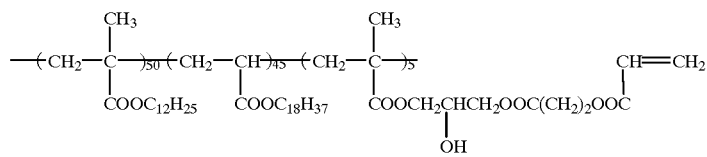

SYNTHESIS EXAMPLE 3 OF RESIN FOR DISPERSION STABILIZATION (P)

Synthesis of Resin for Dispersion Stabilization (P-3)

A mixed solution of 96 g of tridecyl methacrylate, 4 g of 11-methacrylamidoundecanoic acid and 200 g of toluene was heated to a temperature of 75° C. under nitrogen gas stream with stirring. To the solution was added 1.0 g of AIBN, followed by reacting for 4 hours. Then, 0.5 g of AIBN was added to the reaction mixture, followed by reacting for 3 hours, and further 0.3 g of AIBN was added thereto, followed by reacting for 3 hours.

After cooling the reaction mixture to a temperature of 40° C., 0.2 g of hydroquinone, 6.9 g of vinyl acetate and 0.05 g of mercury acetate were added thereto, followed by reacting for 2 hours. The temperature thereof was again raised to 70° C., $7.5 \times 10^{-3}$ ml of 100% of sulfuric acid was added thereto and the mixture was reacted for 6 hours. To the reaction mixture was added 0.04 g of sodium acetate trihydrate, the mixture was thoroughly stirred and poured into 4.5 liters of methanol for reprecipitation and purification to obtain 75 g of the desired copolymer as slightly brownish viscous solid. A weight average molecular weight (Mw) thereof was $5.3 \times 10^4$.

Resin (P-3)

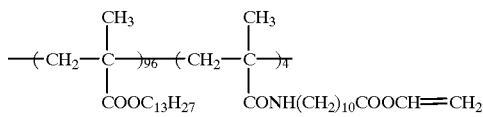

SYNTHESIS EXAMPLE 4 OF RESIN FOR DISPERSION STABILIZATION (P)

Synthesis of Resin for Dispersion Stabilization (P-4)

A mixed solution of 97 g of hexadecyl methacrylate, 3 g of Monomer (Y-1) having the structure shown below and 400 g of isodecane was heated to a temperature of 70° C. under nitrogen gas stream with stirring. To the solution was added 1.5 g of 2,2'-azobis(isovaleronitrile) (abbreviated as AIVN) as a polymerization initiator with stirring, followed by reacting for 4 hours. Then, 0.8 g of AIVN was added to the reaction mixture, followed by reacting for 3 hours, and further 0.5 g of AIVN was added thereto, followed by reacting for 3 hours. The solid content of the resulting reaction mixture was 19.9% by weight. A weight average molecular weight (Mw) of the copolymer obtained was $4 \times 10^4$.

Monomer (Y-1)

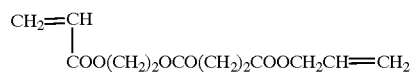

Resin (P-4)

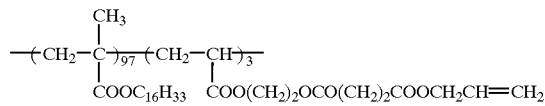

PREPARATION EXAMPLE 1 OF LATEX PARTICLE

Preparation of Latex Particle (D-1)

A mixed solution of 10 g of Resin for Dispersion Stabilization (P-1), 100 g of vinyl acetate, 3 g of octadecyl methacrylate and 392 g of Isopar H was heated to a temperature of 70° C. under nitrogen gas stream with stirring. To the solution was added 1.0 g of 2,2'-azobis (isovaleronitrile) (abbreviated as AIVN) as a polymerization initiator with stirring, followed by reacting for 3 hours. Then, 0.8 g of AIBN was added as a polymerization initiator to the reaction mixture and the mixture was heated to a temperature of 80° C., followed by reacting for 4 hours. The temperature of the reaction mixture was raised to 100° C., followed by stirring for 2 hours, thereby distilling off the unreacted monomers. After cooling the reaction mixture, it was passed through a nylon cloth of 200 mesh. The resulting white dispersion was a latex having a polymerization rate of 97% and an average particle diameter of 0.20 μm. The particle diameter was measured by CAPA-500 manufactured by Horiba Ltd. (hereinafter the same).

A part of the above-described white dispersion was centrifuged at a rotation of $1 \times 10^4$ r.p.m. for one hour and the resin particles precipitated were collected and dried. A weight average molecular weight (Mw) of the resin particles was $2 \times 10^5$. A glass transition point (Tg) thereof was 36° C.

PREPARATION EXAMPLE 2 OF LATEX PARTICLE

Preparation of Latex Particle (D-2)

A mixed solution of 12 g of Resin for Dispersion Stabilization (P-2) and 177 g of Isopar H was heated to a temperature of 60° C. under nitrogen gas stream with stirring. To the solution was added dropwise a mixed solution of 25 g of methyl methacrylate, 75 g of ethyl acrylate, 4 g of octadecyl acrylate, 200 g of Isopar H and 1.5 g of AIVN over a period of 2 hours, followed by stirring for 2 hours. Then, 0.8 g of AIBN was added to the reaction mixture and the mixture was heated to a temperature of 80° C., followed by reacting for 3 hours. After cooling the reaction mixture, it was passed through a nylon cloth of 200 mesh. The resulting white dispersion was a latex having a polymerization rate of 100% and an average particle diameter of 0.22 μm. A weight average molecular weight (Mw) of the resin particles was $2 \times 10^5$. A glass transition point (Tg) thereof was 26° C.

PREPARATION EXAMPLES 3 TO 12 OF LATEX PARTICLE

Preparation of Latex Particles (D-3) to (D-12)

Each of the latex particles was prepared in the same manner as in Preparation Example 1 of Latex Particle expect for using a mixed solution of 9 g of Resin for Dispersion Stabilization (P-3), 100 g of vinyl acetate, Monomer (C) shown in Table 1 and 400 g of Isopar G.

A polymerization rate of each of the resulting latex particles was in a range of from 96% to 98%. An Mw of each of the resin particles was in a range of from $1\times10^5$ to $3\times10^5$, and a Tg thereof was in a range of from 35° C. to 38° C.

TABLE 1

| Preparation Example | Latex Particle (D) | Monomer (C) | | Average Particle Diameter |
|---|---|---|---|---|
| 3 | D-3 | Vinyl Oleate | 5 g | 0.18 μm |
| 4 | D-4 | Octadecyl Vinyl Ether | 4.5 g | 0.19 μm |
| 5 | D-5 | $CH_2=C(CH_3)-COO(CH_2)_2OCO(CH_2)_2COOC_6H_{13}$ | 2 g | 0.20 μm |
| 6 | D-6 | $CH_2=C(CH_3)-COOCH_2CH(OCOC_5H_{11})CH_2OCOC_5H_{11}$ | 3 g | 0.22 μm |
| 7 | D-7 | $CH_2=CH-COOCH_2CH(OCOCH_3)CH_2COOC_6H_{13}$ | 3.5 g | 0.21 μm |
| 8 | D-8 | $CH_2=CH-C_6H_4-COOC_{16}H_{33}$ | 5 g | 0.23 μm |
| 9 | D-9 | $CH_2=C(CH_3)-COOCH_2CH(OCOC_2H_5)CH_2CH_2COOC_5H_{11}$ | 3 g | 0.22 μm |
| 10 | D-10 | $CH_2=C(CH_3)-COO(CH_2)_2OCOCH=CHCOOC_8H_{17}$ | 2.5 g | 0.20 μm |
| 11 | D-11 | $CH_2=C(CH_3)-COO(CH_2)_4SO_2N(C_{10}H_{21})(CH_3)$ | 3 g | 0.23 μm |
| 12 | D-12 | $CH_2=C(CH_3)-COOCH_2CH(OCOC_2H_5)CH_2NH(CH_2)_2OCOC_9H_{19}$ | 2 g | 0.21 μm |

PREPARATION EXAMPLES 13 TO 19 OF LATEX PARTICLE

Preparation of Latex Particles (D-13) to (D-19)

Each of the latex particles was prepared in the same manner as in Preparation Example 2 of Latex Particle expect for using each of Resin for Dispersion Stabilization (P) shown in Table 2 below in place of 12 g of Resin for Dispersion Stabilization (P-2).

A polymerization rate of each of the resulting latex particles was in a range of from 95% to 100% and an average particle diameter thereof was in a range of from 0.18 μm to 0.25 μm with good monodispercity. An Mw of each of the resin particles was in a range of from $1\times10^5$ to $3\times10^5$, and a Tg thereof was in a range of from 24° C. to 28° C.

TABLE 2

| Preparation Example | Latex Particle (D) | Resin for Dispersion Stabilization (P) | Amount |
|---|---|---|---|
| 13 | D-13 | P-5 —(CH$_2$—CH)$_{98}$—(CH$_2$—C(CH$_3$))$_2$— ; COOC$_{20}$H$_{41}$ ; COO(CH$_2$)$_2$OCO(CH$_2$)$_5$OOC—C(Cl)=CH$_2$ | 8 g |
| 14 | D-14 | P-6 —(CH$_2$—C(CH$_3$))$_{70}$—(CH$_2$—C(CH$_3$))$_{27}$—(CH$_2$—C(CH$_3$))$_3$— ; COOC$_{10}$H$_{21}$ ; COOC$_{21}$H$_{43}$ ; COO(CH$_2$)$_2$NHCOO(CH$_2$)$_2$OOC—CH=CH$_2$ | 11 g |
| 15 | D-15 | P-7 —(CH$_2$—C(CH$_3$))$_{95}$—(CH$_2$—C(CH$_3$))$_5$— ; COOC$_{14}$H$_{29}$ ; COO(CH$_2$)$_2$OCO(CH$_2$)$_2$OOCCH$_2$CHCH$_2$OOC—C(CH$_3$)=O ; OH | 12 g |
| 16 | D-16 | P-8 —(CH$_2$—CH)$_{37.5}$—(CH$_2$—C(CH$_3$))$_{2.5}$— ; COOC$_{12}$H$_{25}$ ; COO(CH$_2$)$_3$OCO(CH$_2$)$_5$OOC—C(CN)=CH$_2$ | 9 g |
| 17 | D-17 | P-9 —(CH$_2$—C(CH$_3$))$_{96}$—(CH$_2$—CH)$_4$— ; COOC$_{16}$H$_{33}$ ; COO(CH$_2$)$_3$SO$_2$NH(CH$_2$)$_3$OOC—C(CH$_3$)=CH$_2$ | 12 g |
| 18 | D-18 | P-10 —(CH$_2$—C(CH$_3$))$_{94}$—(CH$_2$—CH)$_3$—(CH$_2$—CH)$_3$— ; COOC$_{18}$H$_{37}$ ; COOH ; COO(CH$_2$)$_5$COO(CH$_2$)$_2$OOC—C(CH$_3$)=CH$_2$ | 11 g |
| 19 | D-19 | P-11 —(CH$_2$—CH)$_{98}$—(CH$_2$—C(CH$_3$))$_2$— ; COOC$_{14}$H$_{29}$ ; COO(CH$_2$)$_2$NHCONH—C$_6$H$_{10}$—OOC—CH=CH$_2$ | 12 g |

PREPARATION EXAMPLES 20 TO 26 OF LATEX PARTICLE

Preparation of Latex Particles (D-20) to (D-26)

Each of the latex particles was prepared in the same manner as in Preparation Example 2 of Latex Particle except for using each of the compounds shown in Table 3 below in place of Monomer (A) i.e., methyl methacrylate and ethyl acrylate, Monomer (C) i.e., octadecyl acrylate, and Resin for Dispersion Stabilization (P-2), respectively.

A polymerization rate of each of the resulting latex particle was in a range of from 95% to 100% and an average particle diameter thereof was in a range of from 0.18 μm to 0.25 μm with good monodispercity.

TABLE 3

| Preparation Example | Latex Particle (D) | Monomer (A) | | Resin for Dispersion Stabilization (P) | | Monomer (C) | | Tg of Resin Particle |
|---|---|---|---|---|---|---|---|---|
| 20 | D-20 | Methyl Methacrylate<br>Ethyl Acrylate | 50 g<br>50 g | P-16 | 10 g | CH$_2$=CH—CONH(CH$_2$)$_3$COOC$_{13}$H$_{27}$ | 3 g | 27° C. |
| 21 | D-21 | Methyl Methacrylate<br>Methyl Acrylate | 25 g<br>75 g | P-5 | 10 g | Octadecyl α-Chloroacrylate | 2 g | 26° C. |
| 22 | D-22 | Methyl Methacrylate<br>Methyl Acrylate | 25 g<br>75 g | P-11 | 11 g | Tetradecyl α-Cyanoacrylate | 3 g | 27° C. |

TABLE 3-continued

| Preparation Example | Latex Particle (D) | Monomer (A) | | Resin for Dispersion Stabilization (P) | | Monomer (C) | | Tg of Resin Particle |
|---|---|---|---|---|---|---|---|---|
| 23 | D-23 | Ethyl Methacrylate<br>Methyl Acrylate | 60 g<br>40 g | P-6 | 12 g | Dodecyl Acrylate<br><br>$CH_2\!=\!\underset{\underset{CH_3}{\|}}{C}\!-\!COO(CH_2)_2OCOCH\!=\!CHCOOC_6H_{13}$ | 2 g<br><br>1 g | 28° C. |
| 24 | D-24 | Methyl Methacrylate<br>2-Cyanoethyl Acrylate<br>Methyl Acrylate | 20 g<br>8 g<br>72 g | P-13 | 10 g | $CH_2\!=\!\underset{\underset{Cl}{\|}}{C}\!-\!COO(CH_2)_2OCO(CH_2)_3COOC_9H_{19}$ | 3 g | 30° C. |
| 25 | D-25 | Vinyl Acetate<br>Styrene<br>Vinyl Propionate | 80 g<br>10 g<br>10 g | P-4 | 12 g | $CH_2\!=\!\underset{\underset{CH_3}{\|}}{C}\!-\!COO(CH_2)_{10}COOC_4H_9$ | 3 g | 34° C. |
| 26 | D-26 | Methyl Methacrylate<br>Acrylic Acid<br>Methyl Acrylate | 20 g<br>5 g<br>75 g | P-14 | 9 g | Docosanyl Acrylate | 4 g | 32° C. |

PREPARATION EXAMPLE 27 OF LATEX PARTICLE

Preparation of Comparative Latex Particle (D-27)

A white dispersion of latex particles was prepared in the same manner as in Preparation Example 1 of Latex Particle expect for eliminating 3 g of octadecyl methacrylate corresponding to Monomer (C). The white dispersion of latex particles had a polymerization rate of 95% and an average particle diameter of 0.24 μm. An Mw of the resin particles was $1\times10^5$ and a Tg thereof was 38° C.

EXAMPLE 1

Preparation of Lithographic Printing Plate Precursor

A composition having the following component was placed in a paint shaker (manufactured by Toyo Seiki Co., Ltd.) together with glass beads and dispersed for 60 minutes. Then, the glass beads were removed by filtration to obtain a dispersion.

| | |
|---|---|
| 10% Aqueous Solution of Gelatin | 94 g |
| Silica: Silysia 430 (average particle size: 2.5 μm; manufactured by Fuji Silysia Chemical Co., Ltd.) | 21.9 g |
| 20% Solution of Colloidal Silica: Snowtex C (average particle size: 10–20 nm; manufactured by Nissan Chemical Industries, Ltd.) | 90 g |
| Fluorinated Alkyl Ester: FC 430 (manufactured by 3M Co.) | 0.24 g |
| Hardening Compound<br>[$CH_2\!=\!CHSO_2CH_2CONH(CH_2)_3NHCOCH_2SO_2CH\!=\!CH_2$] | 1.20 g |
| Water | 65 g |

On a support of Metalme 100TS (manufactured by Toyo Metalizing Co., Ltd.) comprising a PET film having a thickness of 100 μm having provided thereon a vacuum evaporated aluminum layer, the above-described composition was coated using a wire bar and dried at 100° C. for 10 minutes to form an image receiving layer having a dry coating amount of 8 g/m², thereby obtaining a lithographic printing plate precursor.

The Bekk smoothness of the surface of the printing plate precursor was 250 (second/10 ml), and the contact angle with water thereof was 0 degree.

The smoothness of the image receiving layer was determined by measuring the smoothness (second/10 ml) of the printing plate precursor using a Bekk smoothness tester (manufactured by Kumagaya Riko Co., Ltd.) under the condition of an air volume of 10 ml.

The contact angle of the image receiving layer with water was determined by placing 2 μl of distilled water on the surface of the printing plate precursor and measuring the surface contact angle (degree) after 30 seconds using a surface contact angle meter (CA-D, manufactured by Kyowa Kaimen Kagaku Co., Ltd.).

Preparation of Oil-Based Ink (IK-1)

Ten grams of dodecyl methacrylate/acrylic acid copolymer (copolymerization ratio: 95/5 by weight), 10 g of Alkali Blue and 30 g of Shellsol 71 were placed in a paint shaker (manufactured by Toyo Seiki Co., Ltd.) together with glass beads and dispersed for 4 hours to obtain a fine dispersion of Alkali Blue.

Fifty-five grams (as a solid basis) of Latex Particle (D-1) according to Preparation Example 1 of Latex Particle, 18 g of the above-described Alkali Blue dispersion, 20 g of tetradecyl alcohol (FDC-1400 manufactured by Nissan Chemical Industries, Ltd.) and 0.08 g of octadecene maleic acid monooctadecylamide copolymer were diluted with one liter of Isopar G, thereby obtaining blue oil-based ink.

A servo plotter (DA8400, manufactured by Graphtech Co.) able to write an output from a personal computer was converted so that an ink discharge head as shown in FIG. 2 was mounted on a pen plotter section, and the lithographic printing plate precursor described above was placed on a counter electrode positioned at a distance of 1.5 mm from the ink discharge head. Printing was performed on the lithographic printing plate precursor using Oil-Based Ink (IK-1) described above to make a plate. The counter electrode was electrically connected with the vacuum evaporated aluminum layer provided directly under the image receiving layer of the precursor using silver paste at the plate making. Successively, heating was carried out for 20 seconds using a Ricoh Fuser Model 592 (manufactured by Ricoh Co., Ltd.) so as to adjust the surface temperature of the ink image formed to 70° C., thereby sufficiently fixing the image area.

The image on the resulting printing plate was visually observed under an optical microscope of 200 magnifications. As a result, the image had no problem, fine lines and fine letters were good, defect such as blur, disappearance or spread was not observed, and contamination was not observed in the non-image area.

The printing plate was subjected to printing using, as dampening water, a solution prepared by diluting SLM-OD (manufactured by Mitsubishi Paper Mills, Ltd.) 50 times with water, Oliver 94 type (manufactured by Sakurai Seisakusho Co., Ltd.) as a printing machine, and a black ink for offset printing.

As a result, 3000 sheets or more of prints having clear images without the occurrence of background stain were obtained.

Using the above-described ink jet printer, an ink jet test was conducted. As a result, it was found that stable ink jet was obtained even after the lapse of 500 hours.

The oil-based ink of the present invention stored at room temperature for 6 months showed no formation of aggregates, and gave stable ink jet in the ink jet test same as described above.

When a printing plate was prepared using the oil-based ink stored for 6 months and printing was conducted in the same manner as above, 3000 sheets or more of prints having clear images without the occurrence of background stain were obtained.

Furthermore, the redispersibility of the oil-based ink was evaluated under enforced conditions. Specifically, the discharge head used in the above-described printer was filled with the ink, taken away and allowed to stand at 35° C. for 3 days. Then, the discharge head was immersed in Isopar G for 3 minutes, followed by mild stirring. Thereupon, Oil-Based Ink (IK-1) was all removed from the inside of the slit. This is considered to be caused by that Oil-Based Ink (IK-1) adhered to the leading edge of the slit of the discharge head in the non-fluid state during the standing was easily redispersed upon the solvation with the dispersing medium.

From these results it can be seen that the oil-based ink of the present invention is excellent in stability of ink discharge and forms clear images without the occurrence of stain even when it has been continuously employed for a long period of time, and provides a printing plate having good press life.

COMPARATIVE EXAMPLE A

Comparative Example A was conducted in the same manner as in Example 1 with the exception that Oil-Based Ink (IKR-1) for Comparison described below was employed in place of Oil-Based Ink (IK-1) used in Example 1 to prepare a lithographic printing plate.
Oil-Based Ink (IKR-1) for Comparison Oil-Based Ink (IKR-1) for Comparison was prepared in the same manner as in Oil-Based Ink (IK-1) with the exception that 55 g (as a solid basis) of Comparative Latex Particle (D-27) was employed in place of Latex Particle (D-1) used in Oil-Based Ink (IK-1).

When the lithographic printing plate obtained in Comparative Example A described above was subjected to the printing in the same manner as in Example 1, 3000 sheets or more of prints having clear images without the occurrence of background stain were obtained.

However, in the ink jet test, Oil-Based Ink (IKR-1) for Comparison became unstable in ink discharge after the lapse of 250 hours. Further, in Oil-Based Ink (IKR-1) for Comparison stored for 6 months, coagulated precipitates were deposited and were not redispersed even on shaking.

Furthermore, with Oil-Based Ink (IKR-1) the enforced test of ink redispersibility was conducted under the same conditions as in Example 1. As a result, it was found that deposits remained in the slit of the discharge head.

EXAMPLES 2 TO 6 AND COMPARATIVE EXAMPLES B TO C

Using high quality paper having a basis weight of 100 g/m$^2$ as a substrate, one surface of the substrate was coated with a coating for a backcoat layer having the composition shown below using a wire bar to form the backcoat layer having a dry coating amount of 12 g/m$^2$. The Bekk smoothness of the surface of the backcoat layer was adjusted to 50 (second/10 ml) by a calendar treatment.
Coating for Backcoat Layer

| | |
|---|---|
| Kaolin (50% aqueous dispersion) | 200 parts |
| Polyvinyl Alcohol (10% aqueous solution) | 60 parts |
| SBR Latex (solid content: 50%, Tg 0° C.) | 100 parts |
| Melamine Resin (solid content: 80%, Sumirez resin SR-613) | 5 parts |

The other surface of the substrate was coated with each of Coatings A to G for an under layer having the composition shown in Table 4 below using a wire bar to form the under layer having a dry coating amount of 10 g/m$^2$. Then, a calendar treatment was conducted so that the Bekk smoothness of the under layer is adjusted to about 1500 (second/10 ml). The resulting water-resistant supports using Coatings A to G were designated Support Sample Nos. 1 to 7, respectively.

TABLE 4

| | Composition (% by weight on solid basis) | | | | Support |
|---|---|---|---|---|---|
| Coating | Carbon Black | Clay | SBR Latex | Melamine Resin | Sample No. |
| A | 0 | 60 | 36 | 4 | 1 |
| B | 3 | 57 | 36 | 4 | 2 |
| C | 5.4 | 54.6 | 36 | 4 | 3 |
| D | 7.2 | 52.8 | 36 | 4 | 4 |
| E | 9 | 51 | 36 | 4 | 5 |
| F | 15 | 45 | 36 | 4 | 6 |
| G | 30 | 30 | 36 | 4 | 7 |

Coating for Under Layer

| |
|---|
| Carbon Black (30% aqueous dispersion) |
| Clay (50% aqueous dispersion) |
| SBR Latex (solid content: 50%, Tg 25° C.) |
| Melamine Resin (solid content: 80%, Sumirez resin SR-613) |

The components were mixed according to the amounts shown in Table 4, and water was added thereto to adjust the total solid content to 25%, thereby obtaining Coatings A to G for the under layer.
Specific Electric Resistance of Under Layer The specific electric resistance of the under layer was measured in the following manner.

Each of Coatings A to G for the under layer was coated on a sufficiently degreased and washed stainless plate to prepare a layer having a dry coating amount of 10 g/m$^2$. The specific electric resistance of the resulting 7 samples were measured by a three terminal process having a guard electrode according to JIS K-6911. The results are shown in Table 5 below.

TABLE 5

| Coating for Under Layer | Specific Electric Resistance (Ωcm) |
|---|---|
| A | $2 \times 10^{12}$ |
| B | $1 \times 10^{11}$ |
| C | $4 \times 10^9$ |
| D | $1 \times 10^8$ |
| E | $7 \times 10^4$ |
| F | $5 \times 10^3$ |
| G | $4 \times 10^3$ |

On the under layer of each of Support Sample Nos. 1 to 7 was coated a dispersion having the composition shown below to form an image receiving layer having a dry coating amount of 6 g/m², thereby preparing a lithographic printing plate precursor. The Bekk smoothness of the surface of each printing plate precursor was in a range of from 200 to 230 (second/10 ml), and the contact angle with water thereof was 5 degrees or less.

Coating for Image Receiving Layer

A composition having the following component was placed in a paint shaker (manufactured by Toyo Seiki Co., Ltd.) together with glass beads and dispersed for 60 minutes. Then, the glass beads were removed by filtration to obtain a dispersion.

| | |
|---|---|
| 10% Aqueous Solution of Gelatin | 100 g |
| Silica: Silysia 310 (average particle size: 1.4 μm; manufactured by Fuji Silysia Chemical Co., Ltd.) | 22 g |
| Alumina Sol 520 (average particle Size: 10–20 nm; manufactured by Nissan Chemical Industries, Ltd.) | 90 g |
| Fluorinated Alkyl Ester: FC 430 (manufactured by 3M Co.) | 0.3 g |
| Hardening Compound [$CH_2$=$CHSO_2(CH_2)_2O(CH_2)_2O(CH_2)_2SO_2CH$=$CH_2$] | 1.5 g |
| Water | 70 g |

Using the lithographic printing plate precursors thus prepared, plate making was conducted with Oil-Based Ink (IK-1) in the same manner as in Example 1. The counter electrode was electrically connected with the under layer provided directly under the image receiving layer of the precursor using silver paste at the plate making.

Then, the printing plate was subjected to printing using a fully automatic printing machine (AM-2850 manufactured by AM Co., Ltd.) provided with dampening water prepared by diluting SLM-OD 50 times with distilled water in a dish for dampening water thereof and a black ink for offset printing.

The properties of the printing plate and the print obtained were evaluated with respect to the points shown below. The results are shown in Table 6 below.

TABLE 6

| Example | Support Sample No. | Image Quality of Printing Plate | Image Quality of Print | Press Life |
|---|---|---|---|---|
| 2 | 3 | Good | Good | 1500 |
| 3 | 4 | Very Good | Very Good | 3000 |
| 4 | 5 | Very Good | Very Good | 3000 |
| 5 | 6 | Very Good | Very Good | 3000 |
| 6 | 7 | Very Good | Very Good | 3000 |
| Comparative | 1 | Poor | Poor | 50 |
| Example B Comparative Example C | 2 | Poor | Poor | 100 |

1) Image Quality of Printing Plate
Images on the printing plate were visually observed under an optical microscope of 200 magnifications. The results are represented as follows:
Very good: Completely no problem in images, very good fine lines and fine letters
Good: No problem in images, good fine lines and fine letters
Poor: Disappearance or blur of fine lines and fine letters
2) Image Quality of Print
The images of the print were evaluated in the same manner as the image quality of the printing plate described above. The image quality of the print was the same as that of the printing plate in each sample.
3) Press Life
The number of prints obtained was evaluated until background stain or disappearance of image was visually recognized on the print.

With reference to the specific electrical resistance shown in Table 5, the results shown in Table 6 are investigated.

In Examples 2 to 6 according to the present invention wherein the support having an under layer of a small specific electrical resistance of $10^9$ to $10^3$ Ωcm is used, the images have no problem at all, reproduction of fine lines and fine letters is very good, and press life is also good. On the contrary, in Comparative Examples B and C wherein the support having an under layer of a large specific electrical resistance of $10^{12}$ to $10^{11}$ Ωcm is used, disappearance or blur of image occurs on the printing plate precursor. Due to the blur, the resin layer of the image becomes thin and as a result, press life is poor.

These results indicate that the higher the electroconductivity of the under layer provided directly under the image receiving layer, the better the image quality of plate making and the image quality of printing.

EXAMPLE 7

Preparation of Lithographic Printing Plate Precursor

A composition having the following component was placed in a paint shaker (manufactured by Toyo Seiki Co., Ltd.) together with glass beads and dispersed for 60 minutes. Then, the glass beads were removed by filtration to obtain a dispersion.

| | |
|---|---|
| 10% Aqueous Solution of Gelatin | 100 g |
| Silica: Silysia 310 (manufactured by Fuji Silysia Chemical Co., Ltd.) | 25 g |
| Colloidal Silica: Snowtex C (manufactured by Nissan Chemical Industries, Ltd.) | 100 g |
| Sodium Dodecylbenzenesulfonate | 2.0 g |
| Hardening Compound [$CH_2$=$CHCONH(CH_2)NH(CH_2)_2NHCOCH$=$CH_2$] | 2.2 g |
| Water | 65 g |

Using the water-resistant support described in Example 6, the above-described composition was coated thereon using a wire bar and dried at 110° C. for 20 minutes to form an image receiving layer having a coating amount of 6 g/m², thereby obtaining a lithographic printing plate precursor. The Bekk smoothness of the surface of the printing plate precursor was 280 (second/10 ml), and the contact angle with water thereof was 5 degrees or less.

Preparation of Oil-Based Ink (IK-2)

Ten grams of poly(dodecyl methacrylate), 10 g of nigrosine and 30 g of Isopar H were placed in a paint shaker (manufactured by Toyo Seiki Co., Ltd.) together with glass beads and dispersed for 4 hours to obtain a fine dispersion of nigrosine.

Sixty grams (as a solid basis) of Latex Particle (D-2) according to Preparation Example 2, 35 g of the above-described nigrosine dispersion, 20 g of isostearyl alcohol and 0.08 g of octadecyl vinyl ether maleic acid monododecylamide copolymer were diluted with one liter of Isopar G, thereby preparing black oil-based ink.

Using the printing plate precursor and Oil-Based Ink (IK-2) described above, plate making was conducted to prepare a printing plate, and offset printing was performed in the same manner as in Example 6.

The resulting prints had clear images without the occurrence of stain in the non-image area similar to the prints obtained in Example 1, and the press life of the printing plate was as good as 3000 sheets or more.

Further, with Oil-Based Ink (IK-2), the ink jet test for 600 hours and the redispersibility under enforced conditions were carried out in the same manner as in Example 1. Good results similar to those in Example 1 were obtained.

EXAMPLES 8 TO 30

Plate making and printing were conducted in the same manner as in Example 1 with the exception that each oil-based ink described in Table 7 shown below was used in place of Oil-Based Ink (IK-1). The oil-based inks used were prepared in the same manner as in Oil-Based Ink (IK-1) except for using 45 g (as a solid basis) of Latex Particle (D) described in Table 7 shown below in place of Latex Particle (D-1).

TABLE 7

| Example | Oil-Based Ink | Latex Particle (D) |
|---------|---------------|---------------------|
| 8 | IK-3 | D-8 |
| 9 | IK-4 | D-3 |
| 10 | IK-5 | D-4 |
| 11 | IK-6 | D-5 |
| 12 | IK-7 | D-6 |
| 13 | IK-8 | D-7 |
| 14 | IK-9 | D-9 |
| 15 | IK-10 | D-10 |
| 16 | IK-11 | D-11 |
| 17 | IK-12 | D-12 |
| 18 | IK-13 | D-13 |
| 19 | IK-14 | D-14 |
| 20 | IK-15 | D-15 |
| 21 | IK-16 | D-16 |
| 22 | IK-17 | D-18 |
| 23 | IK-18 | D-19 |
| 24 | IK-19 | D-21 |
| 25 | IK-20 | D-23 |
| 26 | IK-21 | D-24 |
| 27 | IK-22 | D-20 |
| 28 | IK-23 | D-17 |
| 29 | IK-24 | D-22 |
| 30 | IK-25 | D-25 |

It has been found that the images on each printing plate had good qualities similar to those in Example 1, and the press life of each printing plate was 3000 sheets or more.

Further, the ink jet test for 600 hours and the redispersibility under enforced conditions were performed in the same manner as in Example 1. Each oil-based ink exhibited good results similar to or more than those of Oil-Based Ink (IK-1) used in Example 1.

EXAMPLE 31
Preparation of Lithographic Printing Plate Precursor

A composition having the following component was placed in a paint shaker together with glass beads and dispersed for 90 minutes. Then, the glass beads were removed by filtration to obtain a dispersion.

| | |
|---|---|
| Silica: Silysia 445 (manufactured by Fuji Silysia Chemical Co., Ltd.) | 40 g |
| 20% Solution of Colloidal Silica: Snowtex C (manufactured by Nissan Chemical Industries, Ltd.) | 200 g |
| 50% Dispersion of Clay | 40 g |
| 10% Solution of Polyvinyl Alcohol: PVA-117 (manufactured by Kuraray Co., Ltd.) | 120 g |
| Melamine Resin | 2.0 g |
| Sodium Chloride | 0.2 g |
| Water | 50 g |

Using the support described in Example 6, the above-described dispersion was applied onto the support using a wire bar and dried to form an image receiving layer having a coating amount of 10 g/m$^2$, thereby obtaining a lithographic printing plate precursor. The Bekk smoothness of the surface of the printing plate precursor was 230 (second/10 ml), and the contact angle with water thereof was 0 degree.

The printing plate precursor was subjected to plate making and printing in the same manner as in Example 6 to prepare a lithographic printing plate except for using Oil-Based Ink (IK-26) having the composition shown below in place of Oil-Based Ink (IK-1).
Preparation of Oil-Based Ink (IK-26)

A mixture of 300 g of a white dispersion of Latex Particle (D-26) according to Preparation Example 26 and 5 g of Victoria Blue B was heated to a temperature of 100° C. and stirred for 4 hours under heating. After cooling to room temperature, the mixture was passed through a nylon cloth of 200 mesh to remove the remaining dye, thereby obtaining a blue resin dispersion having an average particle diameter of 0.25 μm.

Then, 260 g of the above-described blue resin dispersion and 0.09 g of Charge Control Agent shown below were diluted with one liter of Shellsol 71, thereby preparing blue oil-based ink. Charge Control Agent

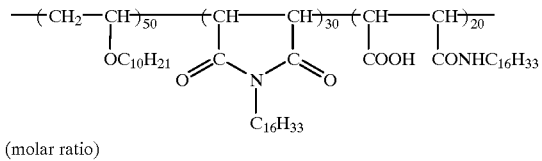

(molar ratio)

The prints thus-obtained had clear images without the occurrence of stain in the non-image area similar to the prints obtained in Example 1, and the press life of the printing plate was good as 3000 sheets or more.

Further, with Oil-Based Ink (IK-26), the ink jet test for 600 hours and the redispersibility under enforced conditions were performed in the same manner as in Example 1. As a result Oil-Based Ink (IK-26) exhibited good results similar to those of Oil-Based Ink (IK-1).

While the invention has been described in detail and with reference to specific embodiments thereof, it will be apparent to one skilled in the art that various changes and modifications can be made therein without departing from the spirit and scope thereof.

What is claim is:

1. A method for preparing a printing plate by an ink jet process consisting essentially of discharging dropwise an oil-based ink using electrostatic attraction from a head having a discharge electrode on a lithographic printing plate precursor positioned between the discharge electrode and a counter electrode and comprising a water-resistant support having provided thereon an image receiving layer having a lithographically printable hydrophilic surface to form an image on the lithographically printable hydrophilic surface, wherein the oil-based ink comprises resin particles dispersed in a nonaqueous carrier liquid having an electric resistance of $10^9$ Ωcm or more and a dielectric constant of 3.5 or less, wherein the resin particles are copolymer resin particles obtained by polymerization granulation of a solution comprising (i), (ii) and (iii):
(i) at least one monofunctional monomer (A) which is soluble in a nonaqueous solvent that is at least miscible with the nonaqueous carrier liquid and becomes insoluble in the nonaqueous solvent by polymerization;
(ii) at least one monomer (C) represented by the formula (I) shown below which is copolymerizable with the monomer (A):

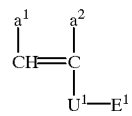
(I)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (III):

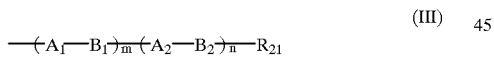
(III)

wherein $R_{21}$ represents a hydrogen atom or an aliphatic group having from 1 to 18 carbon atoms;
$B_1$ and $B_2$, which may be the same or different, each represents —O—, —S—, —CO—, —CO$_2$—, —OCO—, —SO$_2$—, —N($R_{22}$)—, —CON($R_{22}$)—, —N($R_{22}$)CO—, —N($R_{22}$)SO$_2$—, —SO$_2$N($R_{22}$)—, —NHCO$_2$— or —NHCONH—, in which $R_{22}$ has the same meaning as defined for $R_{21}$;
$A_1$ and $A_2$, which may be the same or different, each represents at least one group selected from the group consisting of a group represented by the following formula (IIIa) and a hydrocarbon group having from 1 to 18 carbon atoms, which each may be substituted, provided that, in the case of two or more, it represents a combination of the group represented by the formula (IIIa) and/or the hydrocarbon group:

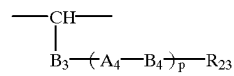
(IIIa)

wherein $B_3$ and $B_4$, which may be the same or different, each has the same meaning as defined for $B_2$ or $B_2$;
$A_4$ represents a hydrocarbon group having from 1 to 18 carbon atoms which may be substituted;
$R_{23}$ has the same meaning as defined for $R_{21}$; and
m, n and p, which may be the same or different, each represents an integer of from 0 to 4, provided that m and n are not 0 at the same time;
U1 represents —COO—, —CONH—, —CON($E_2$)—, —OCO—, —CONHCOO—, —CH$_2$COO—, —(CH$_2$)$_s$OCO—, —O—, —C$_6$H$_4$— or —C$_6$H$_4$—COO—, in which $E_2$ represents an aliphatic group or a substituent represented by the formula (III) described above, and s represents an integer of from 1 to 4; and
$a^1$ and $a^2$, which may be the same or different, each represents a hydrogen atom, a halogen atom, a cyano group, an alkyl group, —COO—$E_3$ or —CH$_2$COO—$E_3$, in which $E_3$ represents an aliphatic group;
(iii) at least one resin for dispersion stabilization (P) which is soluble in the nonaqueous solvent and is a copolymer represented by the formula (II) shown below:

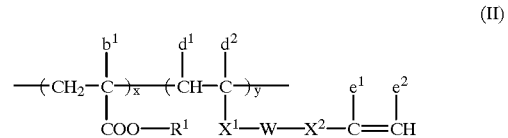
(II)

wherein $R^1$ represents an alkyl group having from 10 to 32 carbon atoms or an alkenyl group having from 10 to 32 carbon atoms;
$b^1$ represents a hydrogen atom or an alkyl group having from 1 to 4 carbon atoms;
$X^1$ and $X^2$, which may be the same or different, each has the same meaning as defined for $U^1$ in the formula (I);
W represents a group connecting $X^1$ and $X^2$ and comprising a carbon atom or a hetero atom selected from an oxygen atom, a sulfur atom, a silicon atom and a nitrogen atom;
$d^1$, $d^2$, $e^1$ and $e^2$, which may be the same or different, each has the same meaning as defined for $a^1$ or $a^2$ in the formula (I); and
x and y each represents a weight ratio of each repeating unit, x represents a number of from 90 to 99, and y represents a number of from 10 to 1 to form an image;
wherein the support has a specific electric resistance of $10^{10}$ Ωcm or less at least at an area directly under the image receiving layer; and
wherein the resin particles dispersed in the oil-based ink are electroscopic particles positively or negatively charged.

2. An method for preparing a printing plate by an ink jet process as claimed in claim 1, wherein the monofunctional monomer (A) is a monomer represented by the following formula (IV):

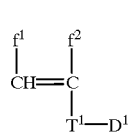

(IV)

wherein $T^1$ represents —COO—, —OCO—, —CH$_2$OCO—, —CH$_2$COO—, —O—, —CONHCOO—, —CONHOCO—, —SO$_2$—, —CON(W$_1$)—, —SO$_2$N(W$_1$)— or a phenylene group (wherein $W_1$ represents a hydrogen atom or an aliphatic group having from 1 to 8 carbon atoms which may be substituted); $D^1$ represents a hydrogen atom or an aliphatic group having from 1 to 6 carbon atoms which may be substituted; and $f^1$ and $f^2$, which may be the same or different, each represents a hydrogen atom, a halogen atom, a cyano group, an alkyl group, —COO—E$_3$— or —CH$_2$COO—E$_3$— (wherein E$_3$ represents an aliphatic group).

3. An method for preparing a printing plate by an ink jet process as claimed in claim 1, wherein the amount of the monomer (C) is from 0.1% to 10% by weight based on the amount of the monomer (A).

4. An method for preparing a printing plate by an ink jet process as claimed in claim 1, wherein the amount of the resin for dispersion stabilization (P) is from 1 to 25 parts by weight of the total amount of the monomers.

5. An method for preparing a printing plate by an ink jet process as claimed in claim 1, wherein the oil-based ink further comprises a coloring material.

6. A method for the preparing of a printing plate by an ink jet process as claimed in claim 1, wherein the oil-based ink is discharged using electrostatic attraction.

7. A method for the preparing of a printing plate by an ink jet process as claimed in claim 1, wherein the water-resistant support is a support having a specific electric resistance of $10^{10}$ Ωcm or less as a whole of the support.

* * * * *